(12) United States Patent
Kukita et al.

(10) Patent No.: US 8,506,097 B2
(45) Date of Patent: Aug. 13, 2013

(54) INTEGRATED MIRROR DEVICE FOR VEHICLE

(75) Inventors: Tomoyuki Kukita, Miyazaki (JP);
Mitsuo Sasaki, Miyazaki (JP);
Yoshiyuki Matsumoto, Saitama (JP);
Masaaki Abe, Saitama (JP)

(73) Assignees: Kabushiki Kaisha Honda Lock, Miyazaki (JP); Honda Motor Co., Ltd., Tokyo (JP)

( * ) Notice: Subject to any disclaimer, the term of this patent is extended or adjusted under 35 U.S.C. 154(b) by 940 days.

(21) Appl. No.: 11/992,027

(22) PCT Filed: Sep. 21, 2006

(86) PCT No.: PCT/JP2006/318693
§ 371 (c)(1),
(2), (4) Date: Sep. 11, 2009

(87) PCT Pub. No.: WO2007/034853
PCT Pub. Date: Mar. 29, 2007

(65) Prior Publication Data
US 2010/0007961 A1   Jan. 14, 2010

(30) Foreign Application Priority Data

Sep. 26, 2005  (JP) ................. 2005-277884
Sep. 26, 2005  (JP) ................. 2005-277885
Sep. 26, 2005  (JP) ................. 2005-277886
Sep. 26, 2005  (JP) ................. 2005-277887
Sep. 26, 2005  (JP) ................. 2005-277891
Sep. 26, 2005  (JP) ................. 2005-277892
Sep. 26, 2005  (JP) ................. 2005-277893

(51) Int. Cl.
*G02B 5/08*       (2006.01)
*G02B 7/182*      (2006.01)
*B60R 1/04*       (2006.01)
*B60R 1/06*       (2006.01)

(52) U.S. Cl.
USPC ................. 359/843; 359/865; 359/877

(58) Field of Classification Search
USPC ................. 359/841, 843, 865, 877
See application file for complete search history.

(56) References Cited

U.S. PATENT DOCUMENTS 2,210,147 A   8/1940   Griffith
4,027,548 A   6/1977   Cummins
(Continued)

FOREIGN PATENT DOCUMENTS

DE   89 11 564 U1   1/1990
DE   89 07 043 U1   10/1990
(Continued)

*Primary Examiner* — Ricky D Shafer
(74) *Attorney, Agent, or Firm* — Carrier Blackman & Associates, P.C.; William D. Blackman; Joseph P. Carrier

(57) ABSTRACT

A vehicular integrated mirror system is provided that is supported on a vehicle body that includes a door, and has an outside mirror disposed outside a vehicle compartment and an interior mirror disposed within the vehicle compartment at a position in the proximity of the outside mirror so that, in cooperation with the outside mirror, a vehicle rear field of vision is obtained, wherein a mirror holder retaining the outside mirror and the inside mirror is swingably supported on mirror support means mounted on the vehicle body in order to change the reflection angle of the two mirror relative to a vehicle driver, and the reflection angle of the outside mirror and the inside mirror is changed by remote drive means that makes the mirror holder swing by remote operation. This enables the reflection angle of the outside mirror and the inside mirror to be remotely controlled.

2 Claims, 26 Drawing Sheets

(56) References Cited

U.S. PATENT DOCUMENTS

| | | | |
|---|---|---|---|
| 4,078,859 A | 3/1978 | Sharett | |
| 4,267,494 A * | 5/1981 | Matsuoka et al. | 318/568.1 |
| 4,439,013 A * | 3/1984 | Hagn et al. | 359/509 |
| 4,540,252 A * | 9/1985 | Hayashi et al. | 359/874 |
| 4,611,102 A * | 9/1986 | Ishida | 200/5 R |
| 4,632,525 A | 12/1986 | Hayashi et al. | |
| 4,727,302 A * | 2/1988 | Mizuta et al. | 318/567 |
| 4,815,689 A | 3/1989 | Schiff | |
| 5,450,246 A * | 9/1995 | Jain | 359/877 |
| 5,694,259 A * | 12/1997 | Brandin | 359/843 |
| 5,798,575 A * | 8/1998 | O'Farrell et al. | 307/10.1 |
| 6,183,096 B1 | 2/2001 | Galicia | |
| 6,273,576 B2 * | 8/2001 | Galicia | 359/871 |
| 7,344,258 B2 * | 3/2008 | MacDougall | 359/509 |
| 7,453,226 B2 * | 11/2008 | Wang et al. | 318/560 |
| 2003/0021048 A1 * | 1/2003 | Olijnyk et al. | 359/877 |
| 2007/0030581 A1 * | 2/2007 | Wang | 359/843 |
| 2007/0153406 A1 | 7/2007 | Matsumoto et al. | |

FOREIGN PATENT DOCUMENTS

| | | |
|---|---|---|
| JP | 61-139537 | 6/1986 |
| JP | 62-143542 | 9/1987 |
| JP | 2-25337 U | 2/1990 |
| JP | 6-278537 A | 10/1994 |
| JP | 3017776 U | 11/1995 |
| JP | WO 96/15379 | 5/1996 |
| JP | 2005-059659 | 3/2005 |
| WO | WO 2005/035314 A1 | 4/2005 |

* cited by examiner

INTEGRATED MIRROR DEVICE FOR VEHICLE

CROSS-REFERENCE TO RELATED APPLICATIONS

The present application is a U.S. National phase of, and claims priority based on PCT/JP2006/318693 filed 21 Sep. 2006, which, in turn, claims priority from Japanese patent applications 2005-277884, 2005-277885, 2005-277886, 2005-277887, 2005-277891, 2005-277892, and 2005-277893, all filed 26 Sep. 2005. The entire disclosure of each of the referenced priority documents is incorporated herein by reference.

TECHNICAL FIELD

The present invention relates to a vehicular integrated mirror system that is supported on a vehicle body that includes a door, and has an outside mirror disposed outside a vehicle compartment and an inside mirror disposed within the vehicle compartment at a position in the proximity of the outside mirror so that, in cooperation with the outside mirror, vehicle rear and side fields of vision are simultaneously obtained.

BACKGROUND ART

An arrangement in which an outside mirror and an inside mirror are disposed with a windowpane interposed therebetween is known from Publication 1 below and, furthermore, an arrangement in which a shaft linking a outside mirror and a inside mirror is mounted on a door window corner portion via a ball joint is known from Publication 2 below.
Publication 1
Japanese Utility Model Registration Publication No. 3017776
Publication 2
U.S. Pat. No. 4,815,689

DISCLOSURE OF INVENTION

Problems to be Solved by the Invention

However, in accordance with such an integrated mirror system, although wide rear and side fields of vision may be obtained by cooperation of the outside mirror and the inside mirror, it might be necessary for a vehicle driver to adjust a reflection angle of the outside mirror and the inside mirror. Publication 1 above merely states that 'employing a wide mirror eliminates the need for adjusting the mirror angle, thus saving effort', and no consideration is given to adjustment of the reflection angle of the outside mirror and the inside mirror.

In the arrangement disclosed by Publication 2 above, holders retaining the outside mirror and the inside mirror are supported at opposite ends of the shaft mounted on the door window corner portion via the ball joint, and when the reflection angle of the outside mirror and the inside mirror is adjusted, manually adjusting the reflection angle of one of the outside mirror and the inside mirror makes the reflection angle of the other of the outside mirror and the inside mirror change in association therewith, and adjustment of the reflection angle of the two mirrors is troublesome.

SUMMARY OF THE INVENTION

The present invention has been accomplished in the light of such circumstances, and it is an object thereof to provide a vehicular integrated mirror system that enables the reflection angle of the outside mirror and the inside mirror to be remotely controlled.

In order to attain the above object, according to a first aspect of the present invention, there is provided a vehicular integrated mirror system that is supported on a vehicle body that includes a door, and has an outside mirror disposed outside a vehicle compartment and an inside mirror disposed within the vehicle compartment at a position in the vicinity of the outside mirror so that, in cooperation with the outside mirror, a vehicle rear field of vision is obtained, characterized in that the system comprises a mirror holder retaining the outside mirror and the inside mirror, mirror support means mounted on the vehicle body so as to swingably support the mirror holder in order to change the reflection angle of the two mirrors relative to a vehicle driver, and remote drive means making the mirror holder swing by remote operation in order to change the reflection angle of the outside mirror and the inside mirror.

According to a second aspect of the present invention, in addition to the first aspect, the remote drive means comprises a remote operation member enabling manual operation by the vehicle driver on a driver's seat and an electric motor supported on the mirror support means so as to exert a motive power for making the mirror holder swing in order to change the reflection angle.

According to a third aspect of the present invention, in addition to the first aspect, the remote drive means is formed by coupling between a remote operation member that enables manual operation by the vehicle driver on a driver's seat and the mirror holder with a transmission member for directly transmitting to the mirror holder an operating force of the remote operation member.

According to a fourth aspect of the present invention, in addition to the first aspect, the outside mirror and the inside mirror are retained respectively by a pair of mirror holders swingably supported on the mirror support means via swing support portions that are independent from each other, and swing centers of the two swing support portions are set so as to be the same.

According to a fifth aspect of the present invention, in addition to the first aspect, the position of the center of gravity of the overall combination of the outside mirror, the inside mirror, and the mirror holder retaining these mirrors in common is set at the same as a swing center of the mirror holder.

According to a sixth aspect of the present invention, in addition to the first aspect, the mirror holder comprises a holder plate that is disposed in common for the outside mirror and the inside mirror, is coupled to the remote drive means and is swingably supported by the mirror support means, and a retaining member that retains one of the outside mirror and the inside mirror and is swingably supported on the holder plate, fine adjustment drive means for finely adjusting the reflection angle of one of the outside mirror and the inside mirror being provided between the holder plate and the retaining member.

According to a seventh aspect of the present invention, in addition to the first aspect, a bracket mounted on a support plate provided on the vehicle body, which includes the door, is provided with a swing support portion for swingably supporting the outside mirror and the inside mirror, and a outside housing covering the outside mirror from the front side of the vehicle is mounted on the bracket. According to an eighth aspect of the present invention, in addition to the seventh aspect, a holder plate retaining the outside mirror and the inside mirror is swingably supported on the mirror support portion, and the support plate is provided with a through hole for the holder plate to run through.

According to a ninth aspect of the present invention, in addition to the eighth aspect, a seal member for blocking the through hole is provided between the support plate and the holder plate.

According to a tenth aspect of the present invention, in addition to any one of the seventh to ninth aspects, the bracket is mounted on the support plate from the exterior of the vehicle compartment.

According to an eleventh aspect of the present invention, in addition to the first aspect, the lateral width in a vertically intermediate section of the inside mirror is set so as to be at least 50 mm but less than a value that causes reflection of the vehicle driver.

According to a twelfth aspect of the present invention, in addition to the eleventh aspect, a inside housing covering the inside mirror from the front is disposed within a projection area when the vehicle driver views a outside housing covering the outside mirror from the front side of the vehicle.

According to a thirteenth aspect of the present invention, in addition to the eleventh or twelfth aspect, at least one of upper edges and lower edges of the outside mirror and the inside mirror are substantially aligned on one imaginary line.

According to a fourteenth aspect of the present invention, in addition to the first aspect, the outside mirror and the inside mirror are formed in curved shapes with the same center of curvature and the same radius of curvature.

According to a fifteenth aspect of the present invention, in addition to the first aspect, an outside mirror holder and an inside mirror holder individually retaining the outside mirror and the inside mirror are supported on the mirror support means so as to swing independently from each other, and the remote drive means comprises outside drive means and inside drive means for respectively making the outside and inside mirror holders swing and a control unit controlling the operation of the outside drive means and the inside drive means, the control unit being switchable between a normal operation control state in which the outside and inside drive means are both operated so as to make the outside mirror holder and the inside mirror holder swing in association and a specific operation control state in which only the outside drive means is operated so as to make the outside mirror holder swing on its own.

According to a sixteenth aspect of the present invention, in addition to the fifteenth aspect, the control unit selects the specific operation control state and operates the outside drive means only by a predetermined amount toward the side that makes the direction the outside mirror faces change downward only by a predetermined angle in response to an operation of operation means operated by the vehicle driver when reversing the vehicle.

According to a seventeenth aspect of the present invention, in addition to the fifteenth aspect, the control unit selects the specific operation control state and operates the outside drive means only by a predetermined amount toward the side that makes the direction the outside mirror faces change outward only by a predetermined angle in response to an operation of operation means operated by the vehicle driver when changing the path of the vehicle.

According to an eighteenth aspect of the present invention, in addition to the sixteenth or seventeenth aspect, the control unit operates the outside drive means so as to return the outside mirror holder to the position the outside mirror holder was in before the specific operation control state started in response to the vehicle driver completing operation of the operation means.

According to a nineteenth aspect of the present invention, in addition to the first aspect, the vehicular integrated mirror system is arranged so that the outside mirror and the inside mirror can be put in an anti-glare state.

According to a twentieth aspect of the present invention, in addition to the nineteenth aspect, the vehicular integrated mirror system comprises a control unit for simultaneously carrying out changeover control between anti-glare and non-anti-glare states of the outside mirror and the inside mirror.

According to a twenty-first aspect of the present invention, in addition to the nineteenth aspect, the vehicular integrated mirror system comprises a control unit for carrying out changeover control between anti-glare and non-anti-glare states of the outside mirror and the inside mirror independently for the left and right of the vehicle.

According to a twenty-second aspect of the present invention, in addition to the first aspect, a outside housing disposed outside the vehicle body, which includes the door, and covering the outside mirror so as to dispose the outside mirror in an opening is supported on the vehicle body so as to be able to pivot between a projecting position in which the outside mirror is directed toward the rear of the vehicle and a retracted position in which the outside mirror is directed toward the vehicle body side, and the outside housing has a pivot center thereof set at substantially the middle along the lateral direction of the outside housing in the projecting position.

According to a twenty-third aspect of the present invention, in addition to the twenty-second aspect, the inside mirror is supported on mirror support means fixed to the vehicle body so that the inside mirror can swing independently from the outside mirror, and the remote drive means comprises housing drive means for pivoting the outside housing, inside drive means for making the inside mirror swing, and a control unit controlling the operation of the housing drive means and the inside drive means, the control unit operating the inside drive means so as to make the inside mirror swing outward only by a fixed angle in response to operation of the housing drive means in order to pivot the outside housing toward the retracted position side.

Effects of the Invention

In accordance with the first aspect of the present invention, it is possible to change the reflection angle of the outside mirror and the inside mirror relative to the vehicle driver by remote operation and easily make them match the vehicle driver.

Furthermore, in accordance with the second aspect of the present invention, operating the electric motor in response to operation of the remote operation member by the vehicle driver enables the reflection angle of the outside mirror and the inside mirror relative to the vehicle driver to be remarkably easily changed.

In accordance with the third aspect of the present invention, the reflection angle of the outside mirror and the inside mirror relative to the vehicle driver can be changed by an operating force when the vehicle driver manually operates the remote operation member.

In accordance with the fourth aspect of the present invention, it is possible to change over as necessary between a state in which the outside mirror and the inside mirror are moved independently and a state in which they are moved simultaneously, and when either one of mechanisms for driving the outside mirror and the inside mirror malfunctions, it is possible to replace only the side that malfunctions, thus making it possible to avoid the occurrence of an uncomfortable sensation in the field of vision obtained by cooperation of the two mirrors.

In accordance with the fifth aspect of the present invention, it is possible to reduce the influence of vibration from the vehicle body side on the outside mirror and the outside mirror.

In accordance with the sixth aspect of the present invention, it is possible to obtain a sensation of unity for images obtained by the outside mirror and the inside mirror by fine adjustment of the reflection angle of one of the outside mirror and the inside mirror according to variations in component dimensions and individual differences in vehicle drivers.

In accordance with the seventh aspect of the present invention, wind pressure accompanying vehicle travel does not impinge directly on the outside mirror, the force supporting the inside mirror and the outside mirror only needs to be relatively small, only a small force is therefore required for adjusting the swing angle of the outside mirror and the inside mirror, and the swing angle of the outside mirror and the inside mirror can be easily adjusted. Furthermore, not only is the outside housing mounted on the bracket but also the swing support portion for swingably supporting the outside mirror and the inside mirror is provided thereon, and it is therefore possible to reduce the number of components to be combined, and reduce the variation when assembling components.

In accordance with the eighth aspect of the present invention, by providing the through hole in the support plate, through which runs the holder plate that is supported by the mirror support means provided on the bracket and that retains the outside and inside mirrors, assembly of the bracket on the support plate is easy.

In accordance with the ninth aspect of the present invention, since the through hole is blocked by the seal member, it is possible to prevent air or rainwater from flowing between the interior and the exterior of the vehicle compartment without interfering with the swing operation of the holder plate.

In accordance with the tenth aspect of the present invention, when the bracket is mounted on the support plate, it is not obstructed by components forming the vehicle body, and the work of mounting the bracket on the support plate becomes easy.

In accordance with the eleventh aspect of the present invention, no matter who the vehicle driver is, when viewing the inside mirror the minimum necessary field of vision is ensured and a rear image can be viewed stereoscopically, and the sensation of perspective is not impaired. According to 'Japanese Anthropometric Data' published by the Research Institute of Human Engineering for Quality Life in October 1997, the minimum value for the pupillary distance between the two eyes of a person of 18 years or older, which is the age for obtaining a vehicle driving license, is 50.2 mm, which is for 20 to 24 year-old females; by setting the minimum value for the lateral width on the vertically center line of the inside mirror at 50 mm, it is possible for any driver to ensure a minimum necessary field of vision by means of the inside mirror. By setting the maximum value for the lateral width on the vertically center line of the inside mirror so as to be smaller than a value that allows the vehicle driver to be reflected thereon, a blind spot can be prevented from being caused by reflection of the vehicle driver, thereby enhancing the visibility.

Furthermore, in accordance with the twelfth aspect of the present invention, there is no area that becomes a blind spot due to the inside housing, and the blind spot area of the outside mirror is minimized.

In accordance with the thirteenth aspect of the present invention, when the vehicle driver looks at the outside mirror and the inside mirror, the fields of vision obtained by the inside mirror and the outside mirror are substantially aligned on at least one of the upper edge and the lower edge, and when the rear field of vision is momentarily checked, it can be carried out without an uncomfortable sensation.

In accordance with the fourteenth aspect of the present invention, it is possible to obtain a wider field of vision by making the outside mirror and the inside mirror in a curved form and, moreover, since the outside mirror and the inside mirror have the same center of curvature, it becomes possible to view images obtained by the two mirrors continuously without an uncomfortable sensation.

In accordance with the fifteenth aspect of the present invention, it is possible to easily adjust the reflection angle of the outside mirror and the inside mirror relative to the vehicle driver by allowing the reflection angles of the two mirrors to be changed by operation of the drive means, and it is also possible to change the side field of vision of the vehicle so as to match the travel state of the vehicle, depending on the travel of the vehicle.

In accordance with the sixteenth aspect of the present invention, when the vehicle reverses, since the direction that the outside mirror faces changes downward only by a predetermined angle, it is possible to move the vehicle side field of vision given by the outside mirror further downward so as to better match the time when the vehicle reverses while maintaining the rear field of vision given by the inside mirror, for which the reflection angle does not change when the vehicle reverses, without obtaining an unnecessary field of vision.

In accordance with the seventeenth aspect of the present invention, when the vehicle changes lane, it is possible to move the vehicle side field of vision given by the outside mirror further outward so as to better match the time when the vehicle changes lane while maintaining the rear field of vision given by the inside mirror, for which the reflection angle does not change when the vehicle changes lane, without obtaining an unnecessary field of vision.

In accordance with the eighteenth aspect of the present invention, in response to the travel state of the vehicle returning to a normal state, the outside mirror can be returned to the position it was in before the specific operation control state started without being accompanied by a special operation.

In accordance with the nineteenth aspect of the present invention, putting the outside mirror and the inside mirror into an anti-glare state prevents the vehicle driver from becoming dazzled by reflection of light from a light source to the rear of the vehicle.

In accordance with the twentieth aspect of the present invention, since the outside mirror and the inside mirror are simultaneously put into an anti-glare state, images reflected from the two mirrors can be viewed without an uncomfortable sensation.

In accordance with the twenty-first aspect of the present invention, it is possible to put, of the right and left sides of the vehicle, only the side on which there is glare into an anti-glare state, and excellent visibility can be obtained depending on the environment surrounding the vehicle.

In accordance with the twenty-second aspect of the present invention, since the pivot center of the outside housing is set at a substantially middle position along the lateral direction of the outside housing that is in a projecting position, substantially the middle of the outside housing is supported so that it can pivot toward the vehicle body side, thus enhancing the weight balance of the outside housing, and the outside housing can be well supported so as to withstand vibration from the vehicle body or wind flow while avoiding any increase in weight due to the support strength being increased.

Moreover, in accordance with the twenty-third aspect of the present invention, since, when the outside housing pivots to the retracted position, the inside mirror swings outward only by a fixed angle, part of the rear field of vision that is lost by the outside mirror within the outside housing facing the vehicle body side can be maintained by the inside mirror.

The above-mentioned object, other objects, features, and advantages of the present invention will become apparent from an explanation of preferred embodiments described in detail below by reference to the attached drawings.

Figure 1:
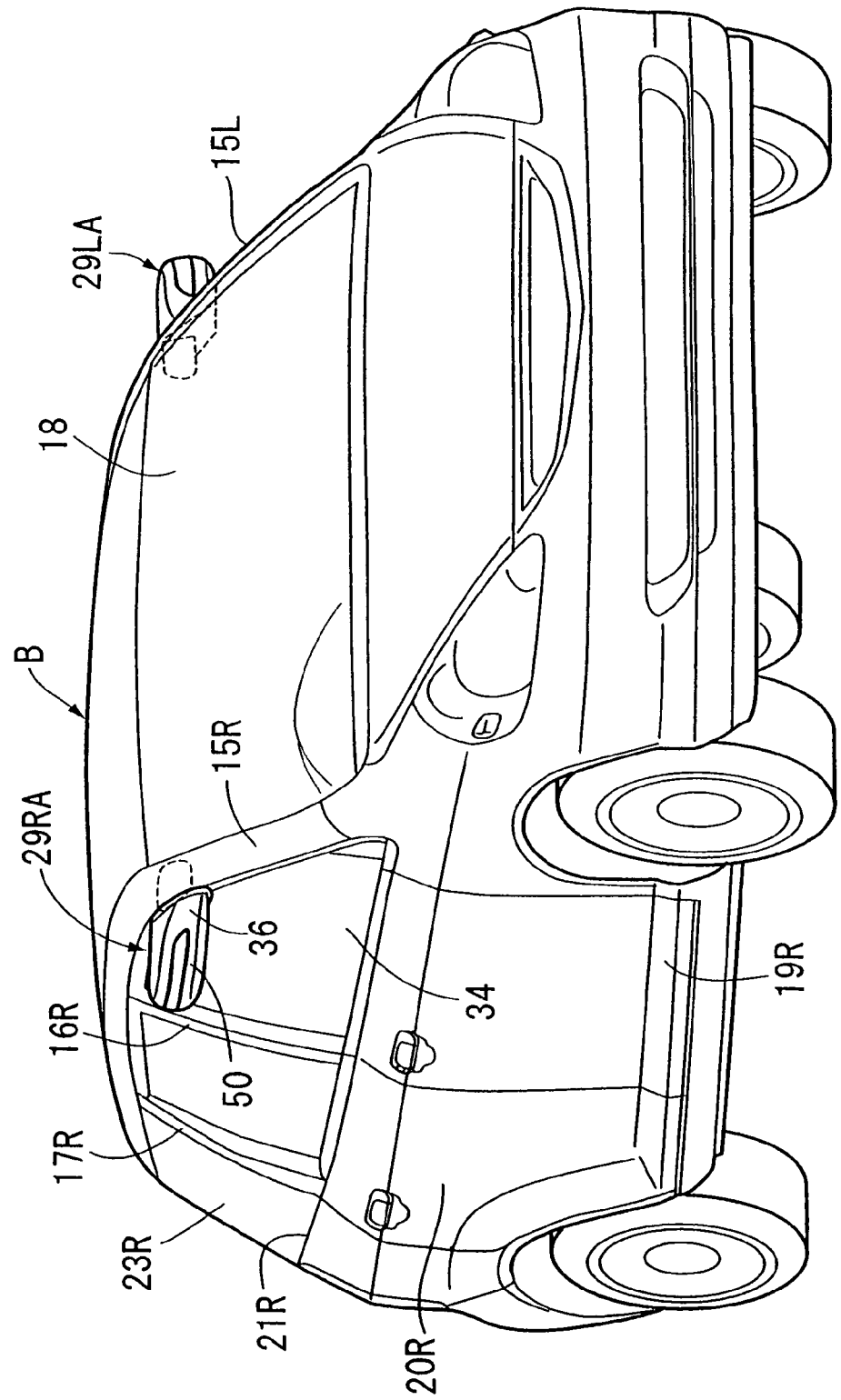
FIG. 1 is a front perspective view of a passenger motor vehicle (first embodiment).

EXPLANATION OF REFERENCE NUMERALS AND SYMBOLS 19L, 19R Door
24 Vehicle compartment
25 Driver's seat
27L, 27R Outside mirror
28L, 28R Inside mirror
33 Support plate
35 Bracket
36 Outside housing
38 Actuator case, which is mirror support means
39 Inside housing
40, 40' Holder plate
41 Seal member
46, 46', 120, 121 Mirror holder
58 Inside Retaining member
59 Through hole
63 Swing support portion
77, 78, 133, 134, 137, 138 Electric motor
84, 108, 140, 151, 160, 182 Remote drive means
85 Lateral movement operation switch, which is remote operation member
86 Vertical movement operation switch, which is remote operation member
94 Fine adjustment drive means
109 Remote operation member
110, 111, 112, 113 Wire, which is transmission member
118 Outside actuator case, which is mirror support means
119 Inside actuator case, which is mirror support means
120 Outside mirror holder
121 Inside mirror holder
128 Outside swing support portion
129 Inside swing support portion
149 Outside drive means (Outside drive device)
150 Inside drive means (Inside drive device)
154, 161, 183 Control unit
176 Outside housing
180 Housing drive means
B Vehicle body
C1 Swing center of mirror holder
C2 Swing center of swing support portion
C3 Pivot center of outside housing
IL Imaginary line

DETAILED DESCRIPTION INCLUDING BEST MODE FOR CARRYING OUT THE INVENTION

Modes for carrying out the present invention are explained below by reference to embodiments shown in the attached drawings.

Embodiment 1

A first embodiment of the present invention is explained by reference to FIG. 1 to FIG. 11; first, in FIG. 1 to FIG. 3, a vehicle body B of a passenger motor vehicle is equipped with left and right front pillars 15L and 15R, left and right center pillars 16L and 16R, and left and right rear pillars 17L and 17R in sequence from the front with a gap therebetween, and left and right opposite side portions of a windshield 18 are supported by the left and right front pillars 15L and 15R. Disposed respectively between the left and right front pillars 15L and 15R and the left and right center pillars 16L and 16R so that they can be opened and closed are left and right front side doors 19L and 19R forming part of the vehicle body B, and disposed respectively between the left and right center pillars 16L and 16R and the left and right rear pillars 17L and 17R so that they can be opened and closed are left and right rear side doors 20L and 20R forming part of the vehicle body B.

Figure 4:
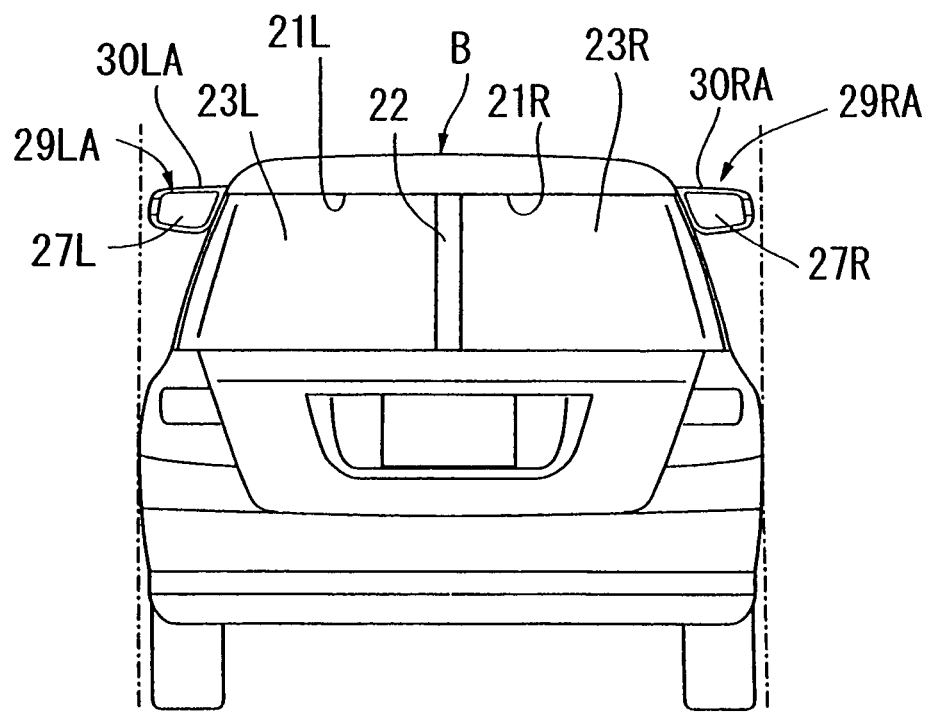
FIG. 4 is a rear view of the passenger motor vehicle (first embodiment).

Referring in addition to FIG. 4, provided in a central part in the width direction of a rear part of the vehicle body B between the left and right rear pillars 17L and 17R is a pillar 22 for forming left and right rear windows 21L and 21R respectively, and mounted on the left and right rear windows 21L and 21R are left and right rear glasses 23L and 23R so that opposite side portions are supported by the left and right rear pillars 17L and 17R and the pillar 22.

A vehicle compartment 24 is formed within the vehicle body B; among the plurality of pillars that the vehicle body B is equipped with on left and right side faces, that is, among the front pillars 15L and 15R, the center pillars 16L and 16R, and the rear pillars 17L and 17R, the left and right rear pillars 17L and 17R, which are in the rearmost part, are positioned to the front of left and right corners in the rearmost part of the vehicle compartment 24. That is, the left and right corners of the rearmost part of the vehicle compartment 24 are formed respectively from the left and right rear glasses 23L and 23R, and the left and right rear glasses 23L and 23R are curved so as to form the left and right corners of the rearmost part of the vehicle compartment 24.

Mounted on an upper part on the front side of the left front side door 19L forming part of the vehicle body B is a left integrated mirror system 29LA having a outside mirror 27L disposed outside the vehicle compartment 24 and a inside mirror 28L disposed within the vehicle compartment 24 at a position in the proximity of the outside mirror 27L so that, in cooperation with the outside mirror 27L, vehicle rear and side fields of vision are simultaneously obtained, and mounted on an upper part on the front side of the right front side door 19R forming part of the vehicle body B is a right integrated mirror system 29RA having a outside mirror 27R disposed outside the vehicle compartment 24 and a inside mirror 28R disposed within the vehicle compartment 24 at a position in the proximity of the outside mirror 27R so that, in cooperation with the outside mirror 27R, vehicle rear and side fields of vision are simultaneously obtained.

Such left and right integrated mirror systems 29LA and 29RA enable a driver seated on a driver's seat 25 (see FIG. 2) within the vehicle compartment 24 to view to the rear and side of the vehicle, and a cross-sectional width WR in the vehicle width direction of the left and right rear pillars 17L and 17R, which are disposed on opposite side faces of the vehicle body B, is set in a range such that they are hidden behind the left and right center pillars 16L and 16R within the rear field of vision obtained by the left and right integrated mirror systems 29LA and 29RA.

In FIG. 5 to FIG. 9, the right integrated mirror system 29RA has a vehicle compartment exterior unit 30RA disposed outside the vehicle compartment 24 and a vehicle compartment interior unit 31RA disposed within the vehicle compartment 24, and is mounted on a support plate 33 provided on a front upper part of a door sash 32 of the right front side door 29RA. The support plate 33 may also be referred to as a mirror support device. A door glass 34 of the right front side door 19R is provided with a cutout portion 34a for arranging the support plate 33.

The outside unit 30RA is formed from a bracket 35 mounted on the support plate 33, a outside housing 36 mounted on the bracket 35, a visor 37 mounted on the outside housing 36, an actuator case 38 as mirror support means fixed to the bracket 35, and the outside mirror 27R disposed within the visor 37 so as to provide a view to the rear of the vehicle, and the inside unit 31RA is formed from a inside housing 39 mounted on the support plate 33 and the inside mirror 28R disposed within the inside housing 39 so as to provide a view to the rear of the vehicle, the outside mirror 27R and the inside mirror 28R being retained by a holder plate 40 of a mirror holder 46, which is shared by the outside unit 30RA and the inside unit 31RA.

The bracket 35 is mounted on the support plate 33 with an outside seal member 41 interposed between the bracket 35 and the support plate 33 from the outside of the vehicle compartment 24. That is, for example, one mounting boss 42 is integrally and projectingly provided on the bracket 35 while running in an air-tight manner through the outside seal member 41 and abutting against an outer face of the support plate 33 and, for example, a pair of screw members 81 and 81 are implanted in the bracket 35, through holes 43 individually corresponding to the mounting boss 42 and the pair of screw members 81 being provided on the support plate 33. A screw member 44 inserted from the interior of the vehicle compartment 24 is screwed into one through hole 43, and end parts, on the vehicle compartment 24 side, of the screw members 81 inserted through the remaining two through holes 43 are screwed into nuts 82 and 82, tightening the screw member 44 and the nuts 82 enabling the bracket 35 to be mounted on the support plate 33.

The outside housing 36, which is made of a synthetic resin, covering the bracket 35 from the front side of the vehicle is mounted on the bracket 35 via a plurality of screw members 47. The open edge of the outside housing 36 is connected to the peripheral edge of the visor 37, which integrally has a bowl-shaped portion 37a disposed within the outside housing 36 and is mounted on the outside housing 36 via a plurality of screw members 48. An opening 49 is provided from an intermediate section to an outer section of the outside housing 36, and a lens 51 forming part of a direction indicator 50 is mounted on the opening 49.

In addition to the mounting bosses 42, two bosses 52 and 52 for securing the inside housing 39 with the support plate 33 interposed therebetween are provided integrally with the bracket 35, and these bosses 52 also run through the outside seal member 41 in an air-tight manner and abut against the outer face of the support plate 33. Furthermore, one boss 53 running though the outside seal member 41 in an air-tight manner and abutting against the outer face of the support plate 33 is also projectingly provided on the visor 37.

An inside seal member 54 is disposed between the synthetic resin inside housing 39 covering the inside mirror 28R from the front side of the vehicle and an inner face of the support plate 33 facing the vehicle compartment 24 side, and the inside housing 39 is mounted on the bracket 35 and the visor 37 via three screw members 55. That is, the support plate 33 is provided with, in addition to the through holes 43, three through holes 56 so as to correspond to the bosses 52 of the bracket 35 and the boss 53 of the visor 37; the screw members 55 inserted through the inside housing 39, the inside seal member 54, and the support plate 33 so as to correspond to the through holes 56 are screwed into the bosses 52 of the bracket 35 and the boss 53 of the visor 37, and tightening the screw members 55 allows the inside housing 39 to be supported on the support plate 33.

Figure 10:
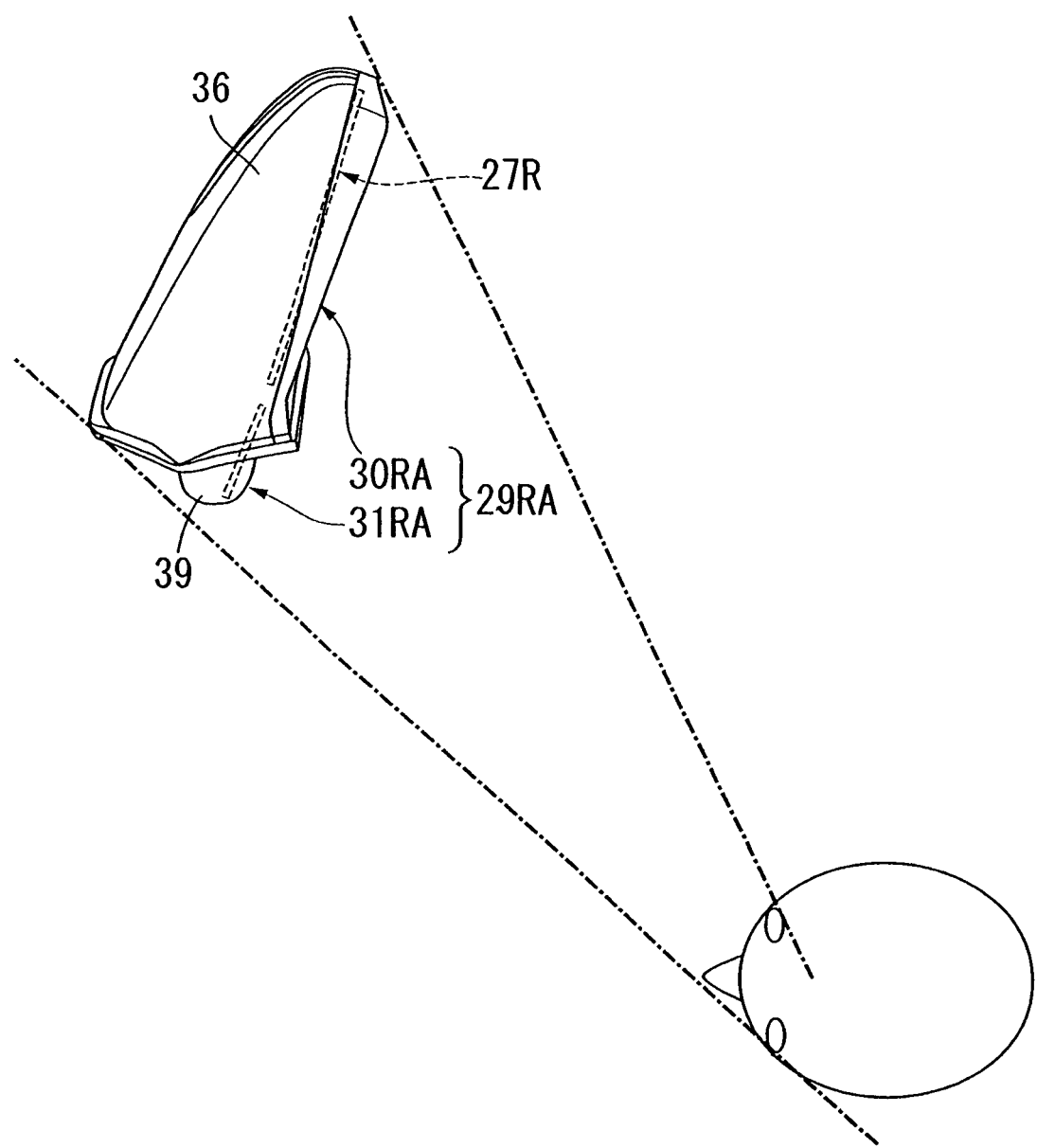
FIG. 10 is a simplified plan view showing the disposition of the right integrated mirror system within a front field of vision of a driver on a driver's seat (first embodiment).

Furthermore, the inside housing 39 is formed so that it is disposed within a projection area that is in the area shown by the dotted-dashed lines in FIG. 10 when the vehicle driver views the outside housing 36 covering the outside mirror 27R from the front side of the vehicle.

An outside retaining member 57 retaining the outside mirror 27R and an inside retaining member 58 retaining the inside mirror 28R are detachably engaged with the holder plate 40 running through holes 59 and 60 provided in the support plate 33 and the inside seal member 54. The holder plate 40, and the outside retaining member 57 and inside retaining member 58 engaged with the holder plate 40, form the mirror holder 46, and the outside mirror 27R and the inside mirror 28R are retained in common by the holder plate 40 of the mirror holder 46.

Figure 5:
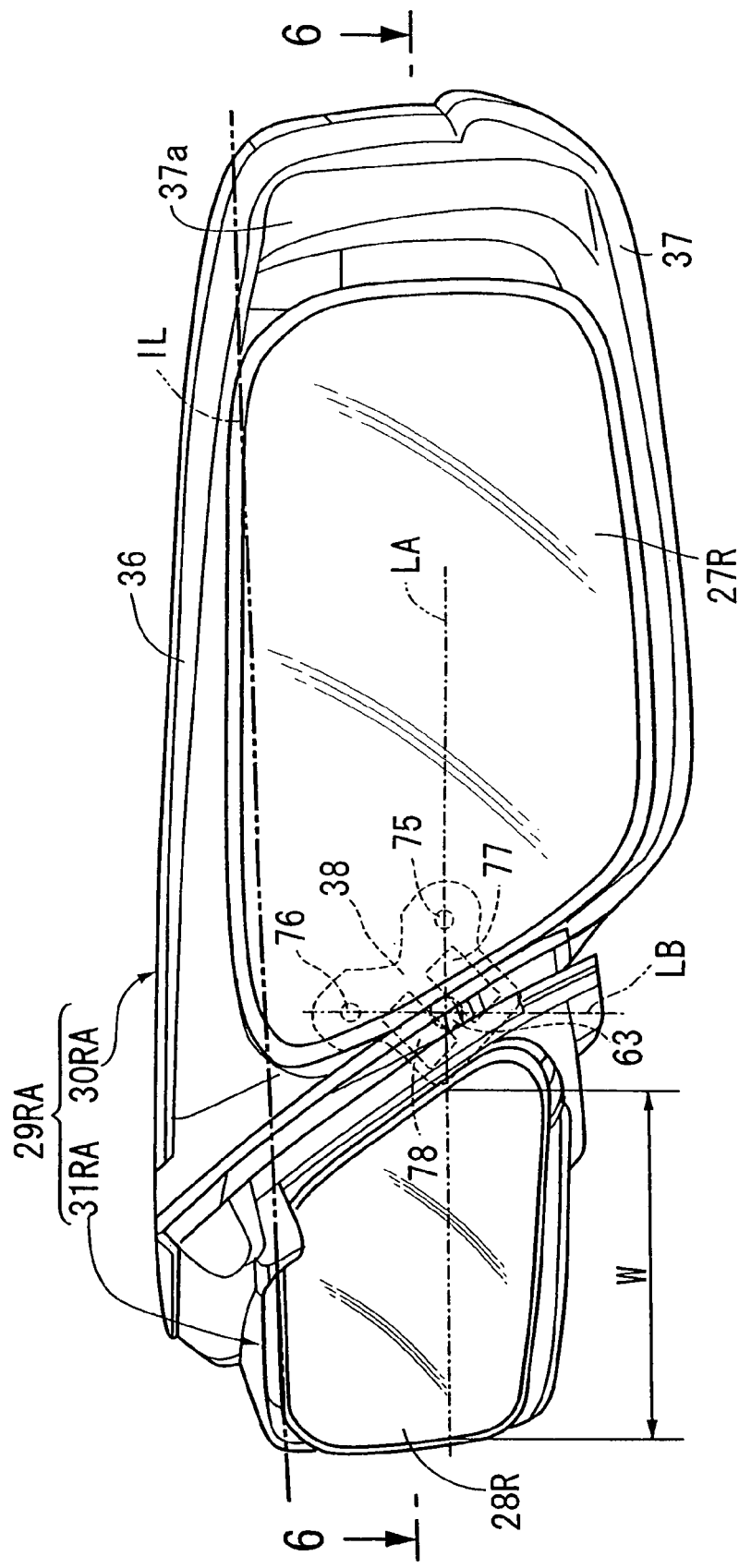
FIG. 5 is a view of a right integrated mirror system from the rear side of the vehicle with a support plate omitted (first embodiment).

Moreover, the outside mirror 27R and the inside mirror 28R are formed in a curved shape with the same center of curvature C and the same radius of curvature R, and at least one of the upper edges and the lower edges of the outside mirror 27R and the inside mirror 28R, in this Embodiment the upper edges, are substantially aligned with one imaginary line IL as clearly shown in FIG. 5. A lateral width W at least in a vertically intermediate section of the inside mirror 28R is set at 50 mm or greater but smaller than a value that causes reflection of the vehicle driver.

Furthermore, a cutout portion 37b is provided in an outer end part of the visor 37 in order to prevent the visor 37 being reflected by the outside mirror 27R disposed within the visor 37.

A protruding portion 41a is formed integrally with the outside seal member 41 so as to protrude toward the inside housing 38 side from the through holes 59 and 60, the holder plate 40 runs through a slit 61 provided in the protruding portion 41a, and an engagement groove 62 is provided in the holder plate 40, the engagement groove 62 engaging via its entire periphery with the protruding portion 41a at the peripheral edge of the slit 61, that is, the outside seal member 41.

The holder plate 40 is supported on a swing support portion 63 provided on the actuator case 38 fixed to the bracket 35 so that the holder plate 40 can swing vertically and laterally. The bowl-shaped portion 37a of the visor 37 is provided with a cutout 45 for positioning the actuator case 38 fixed to the bracket 35 and the holder plate 40 supported by the swing support portion 63 of the actuator case 38.

The swing support portion 63 is formed from a cylindrical support shaft 64 projectingly provided integrally with the actuator case 38 and a support seat face 65 provided on the actuator case 38 so as to face the holder plate 40 side with an arc-shaped cross-section and surround the support shaft 64, and is disposed in a section corresponding to an intermediate section between the outside mirror 27R and the inside mirror 28R.

The holder plate 40 of the mirror holder 46 is provided integrally with a receiving part 66 having its outer face and inner face formed so as to have an arc-shaped cross-section having the same center as the support seat face 65, which has an arc-shaped cross-section, and the outer face of the receiving part 66 is in sliding contact with the support seat face 65. Furthermore, a clamping member 67 having an outer face with an arc-shaped cross-section that is in sliding contact with the inner face of the receiving part 66 is axially movably mounted on the support shaft 64, which projects into the interior of the receiving part 66, and a spring 70 is provided in a compressed state between the clamping member 67 and a retainer 69 fixed to the extremity of the support shaft 64 via a screw member 68, the spring 70 urging the clamping member 67 in a direction in which it clamps the receiving part 66 between the support seat face 65 and the clamping member 67.

In this way, the holder plate 40, that is, the mirror holder 46 retaining the outside mirror 27R and the inside mirror 28R in common, is supported on the swing support portion 63 of the actuator case 38 so that it can swing vertically and laterally, and its swing center C1 is set between the outside mirror 27R and the inside mirror 28R in the vicinity of a part of the actuator case 38 via which it is mounted on the vehicle body B, that is, a part of the bracket 35 via which it is mounted on the support plate 33.

Figure 6:
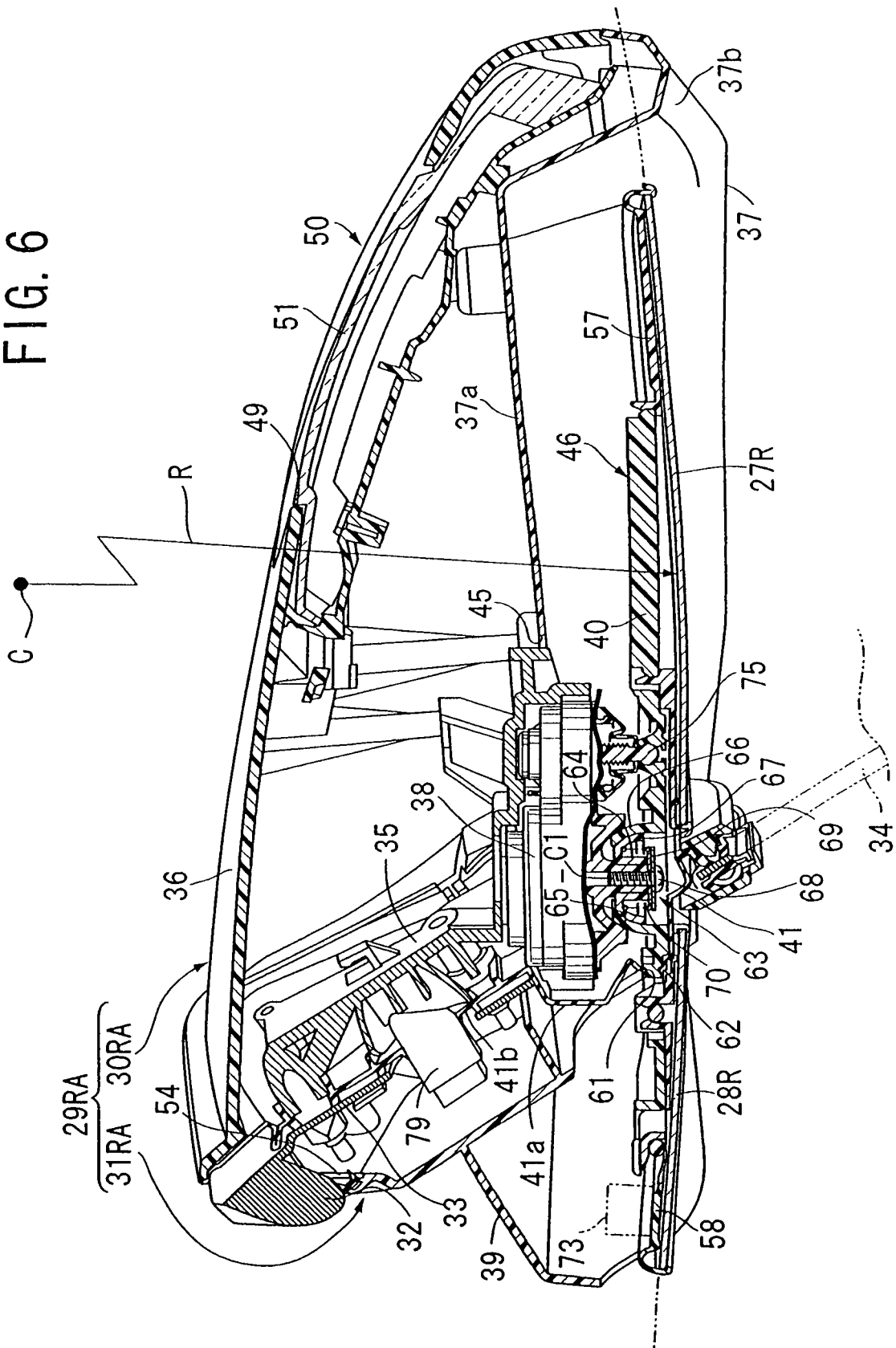
FIG. 6 is a sectional view along line 6-6 in FIG. 5 (first embodiment).
Figure 7:
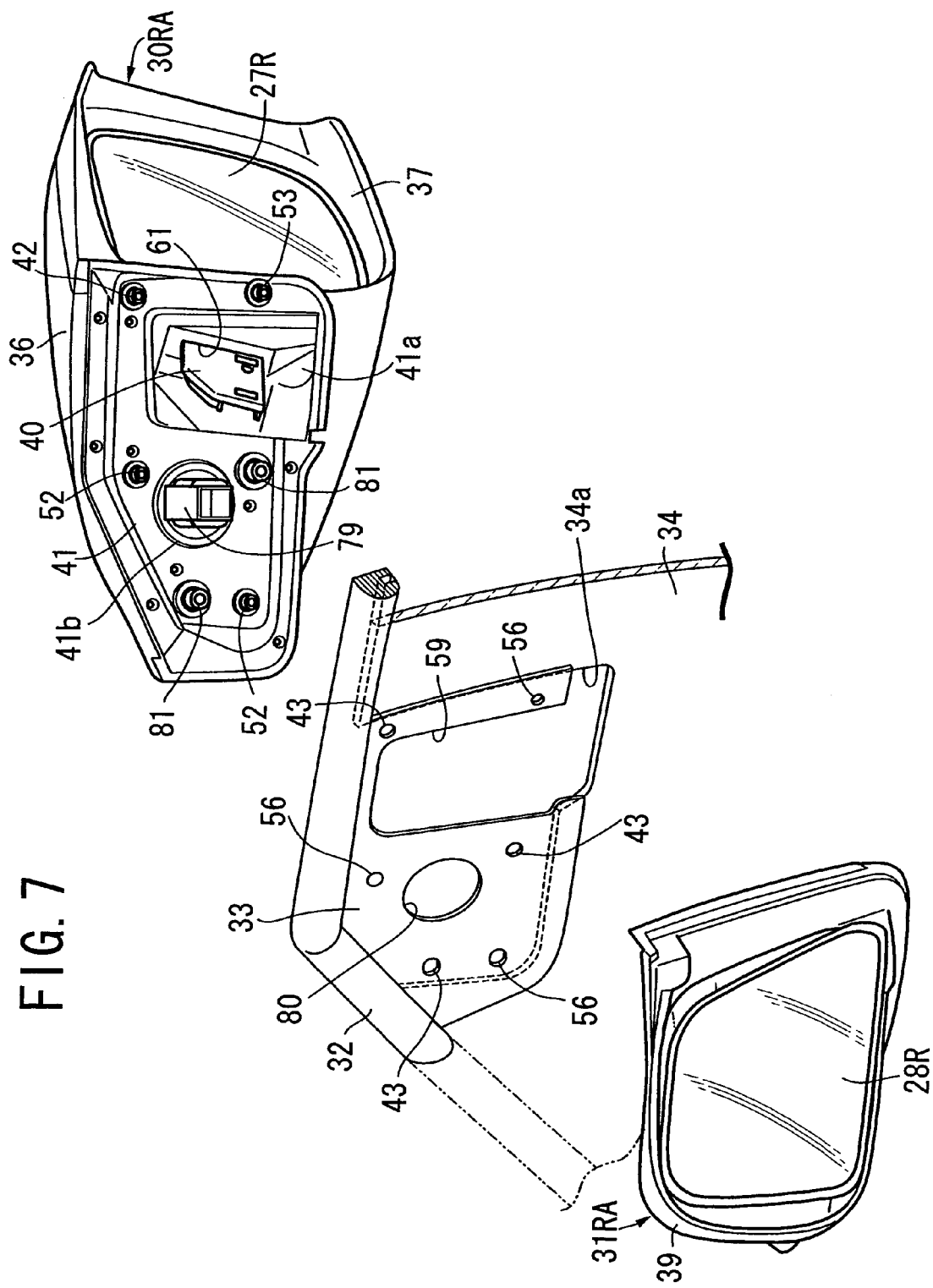
FIG. 7 is an exploded perspective view of the right integrated mirror system (first embodiment).
Figure 8:
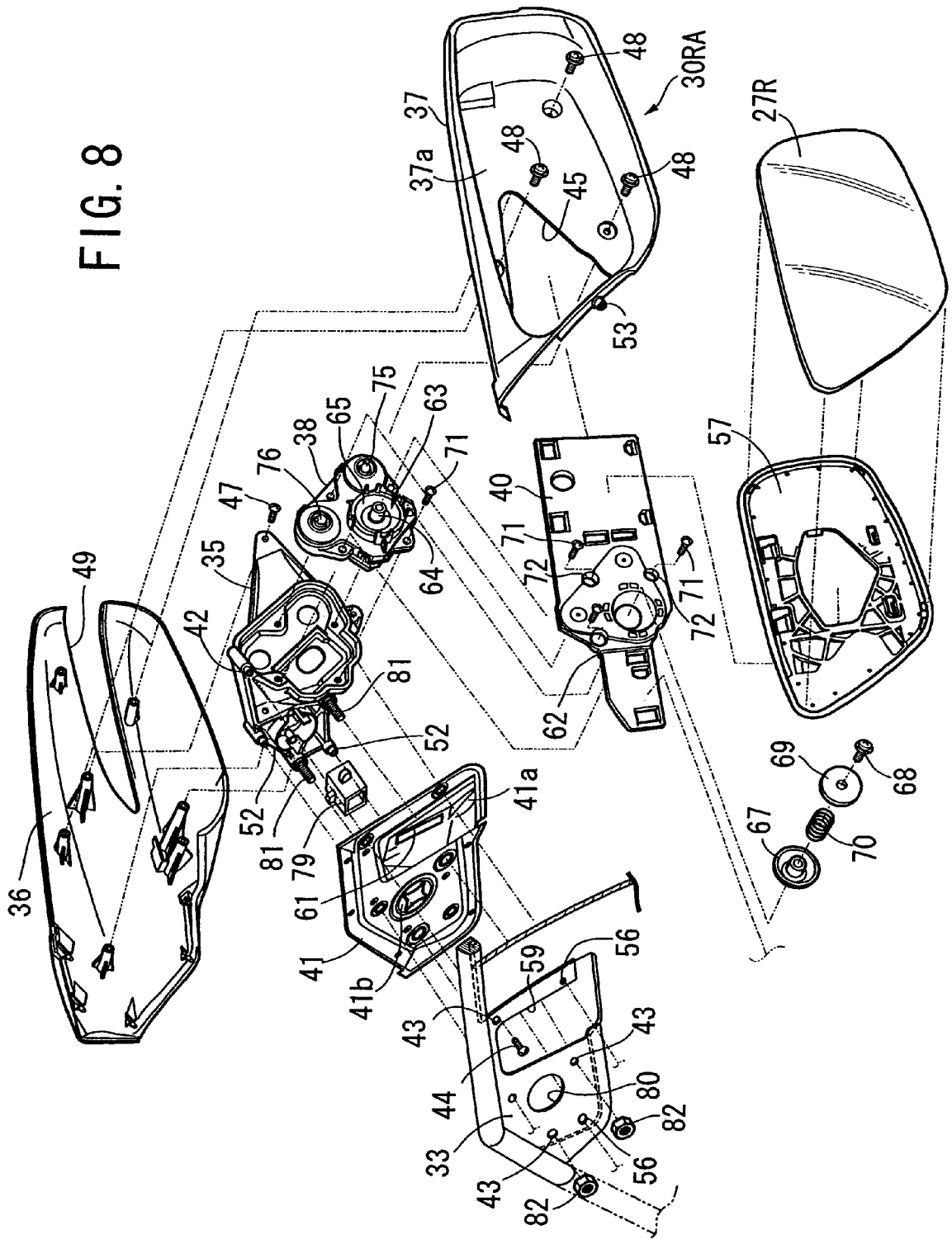
FIG. 8 is an exploded perspective view of part of the right integrated mirror system disposed outside the vehicle compartment (first embodiment).
Figure 9:
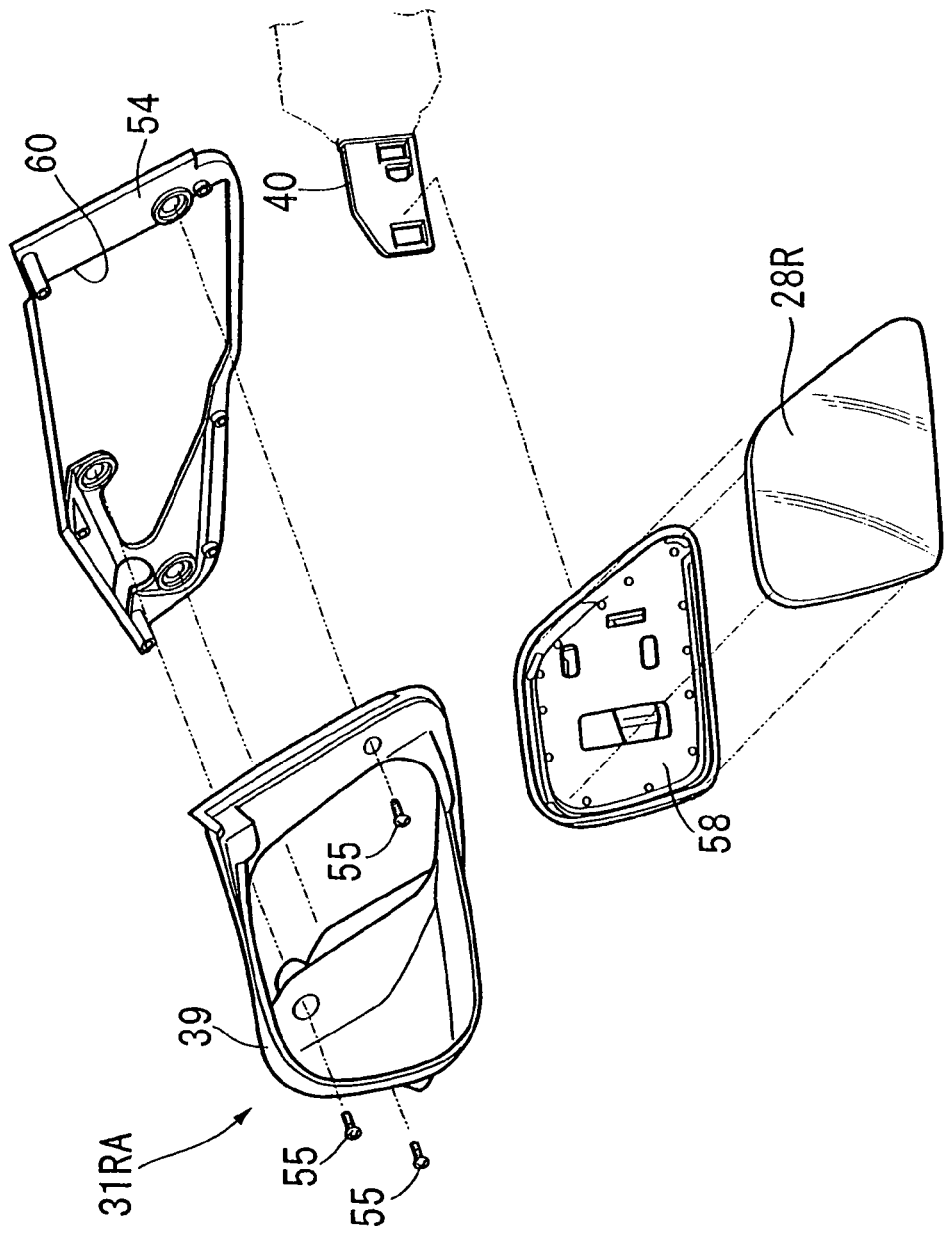
FIG. 9 is an exploded perspective view showing part of the right integrated mirror system disposed within the vehicle compartment (first embodiment).

Moreover, the center of gravity of the entire combination of the outside mirror 27R, the inside mirror 28R, and the mirror holder 46 retaining these mirrors 27R and 28R in common is set at the same position as that of the swing center C1, and when setting the position of the center of gravity, as shown by a dotted-dashed line in FIG. 6, a counterweight 73 may be attached to an appropriate position of the mirror holder 46, in this embodiment on the inside retaining member 58 of the mirror holder 46 since the inside mirror 28R is lighter.

The actuator case 38 is mounted on the bracket 35 via a plurality of screw members 71 so that part thereof is disposed within the protruding portion 41a of the outside seal member 41, and a plurality of access holes 72 are provided in the holder plate 40 so that it is possible to rotate, among the plurality of screw members 71 for fixing the actuator case 38 to the bracket 35, screw members 71 disposed at a position where the holder plate 40 would interfere with the mounting in a state in which, before engaging with the outside retaining member 57 and the inside retaining member 58, the holder plate 40 is supported on the swing support portion 63.

A first drive shaft 75 having its axis on a horizontal first straight line LA passing through the swing support portion 63 and a second drive shaft 76 having its axis on a vertically extending second straight line LB passing through the swing support portion 63 axially movably project from the actuator case 38, and a first electric motor 77 and a second electric motor 78 are housed in and fixed to the actuator case 38, the first electric motor 77 exerting a motive power for axially driving the first drive shaft 75 back and forth, and the second electric motor 78 exerting a motive power for axially driving the second drive shaft 76 back and forth.

One end part of the first drive shaft 75 is coupled to the holder plate 40 of the mirror holder 46 so that it can swivel within a plane containing the first straight line LA, and one end part of the second drive shaft 76 is coupled to the holder plate 40 of the mirror holder 46 so that it can swivel within a plane containing the second straight line LB. When the first drive shaft 75 is axially moved by operation of the first electric motor 77, the mirror holder 46, that is, the outside mirror 27R and the inside mirror 28R, swing laterally around the swing center C1 of the swing support portion 63, and when the second drive shaft 76 is axially moved by operation of the second electric motor 78, the mirror holder 46, that is, the outside mirror 27R and the inside mirror 28R, swing vertically around the swing center C1 of the swing support portion 63.

Mounted detachably on the bracket 35 is a coupler 79 retaining a harness terminal that is to be connected to the first and second electric motors 77 and 78, provided in the support plate 33 is a circular opening 80 for placing the coupler 79, and formed integrally with the outside seal member 41 is a coupler seal portion 41*b* through which the coupler 79 runs and which is in resilient intimate contact with the outer periphery of the coupler 79.

When mounting the above right integrated mirror system 29RA on the support plate 33, the outside unit 30RA is first mounted on the support plate 33 so that, after mounting the bracket 35 on the support plate 33 from the outer side via the outside seal member 41, mounting is carried out in sequence of the outside housing 36 on the bracket 35 and the actuator case 38 on the bracket 35 while the holder plate 40 is supported on the swing support portion 63; moreover, after mounting the visor 37 on the outside housing 36, the outside retaining member 57 retaining the outside mirror 27R engages with the holder plate 40. Subsequently, the inside housing 39 is mounted within the vehicle compartment 24, and the inside retaining member 58 retaining the inside mirror 28R is then engaged with the holder plate 40, thus completing mounting of the right integrated mirror system 29RA on the support plate 33.

As clearly shown in FIG. 4, the vehicle body B is arranged so that the vehicle width of its upper part is narrower than the vehicle width of its lower part, and the right integrated mirror system 29RA is mounted on a front upper part of the right front side door 19R so that the outside unit 30RA, which includes the outside mirror 27R, is disposed within the maximum vehicle width of the vehicle body B.

Figure 11:
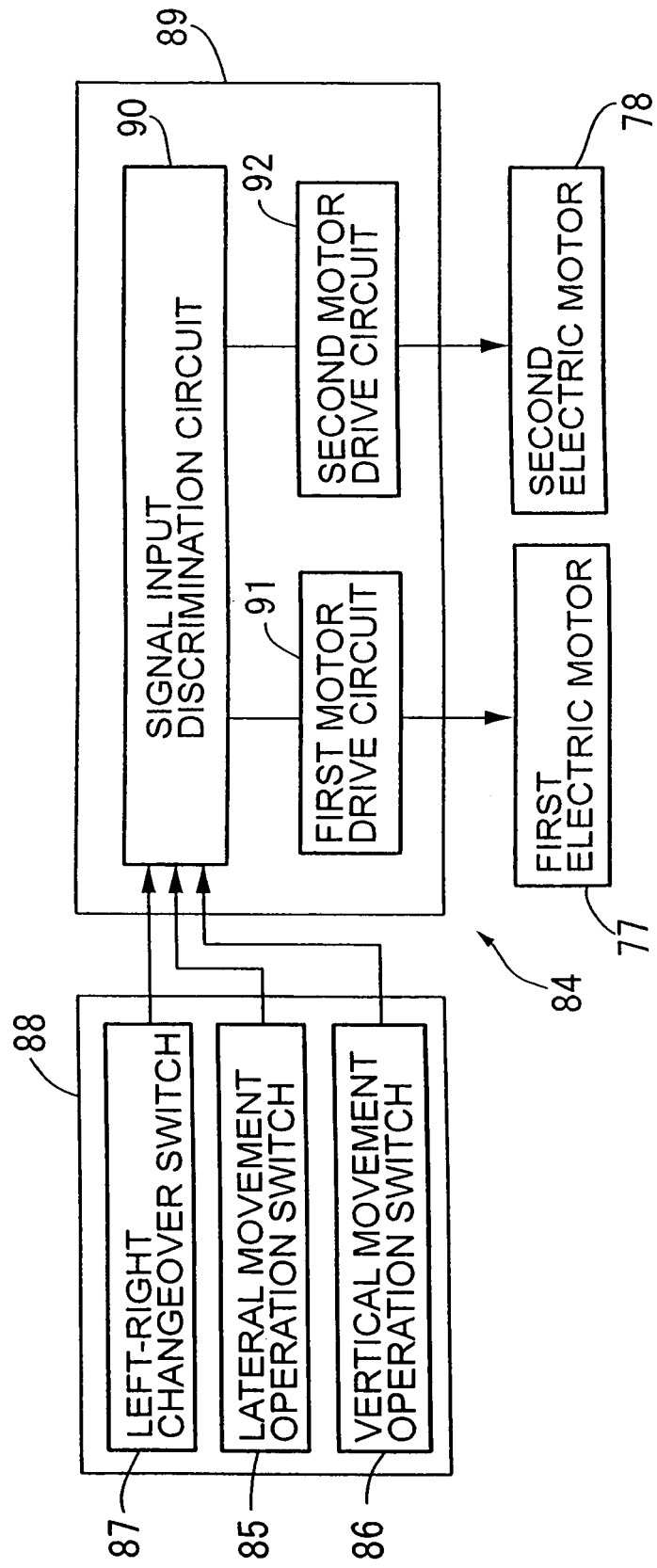
FIG. 11 is a block diagram showing the arrangement of remote drive means (first embodiment).

In FIG. 11, the mirror holder 46 retaining in common the outside mirror 27R and the inside mirror 28R is remotely operated by remote drive means 84 so as to swing in order to change the reflection angle of the outside mirror 27R and the inside mirror 28R.

In a section related to the right integrated mirror system 29RA, the remote drive means 84 is equipped with the first electric motor 77, which exerts a drive force for laterally swinging the outside mirror 27R and the inside mirror 28R, the second electric motor 78, which exerts a drive force for vertically swinging the outside mirror 27R and the inside mirror 28R, a lateral movement operation switch 85 as a first remote operation member that enables manual operation by a vehicle driver on the driver's seat 25, a vertical movement operation switch 86 as a second remote operation member that enables manual operation by a vehicle driver on the driver's seat 25, and a control unit 89 controlling the operation of the first and second electric motors 77 and 78 in response to operation of the lateral movement operation switch 85 and the vertical movement operation switch 86.

Figure 2:
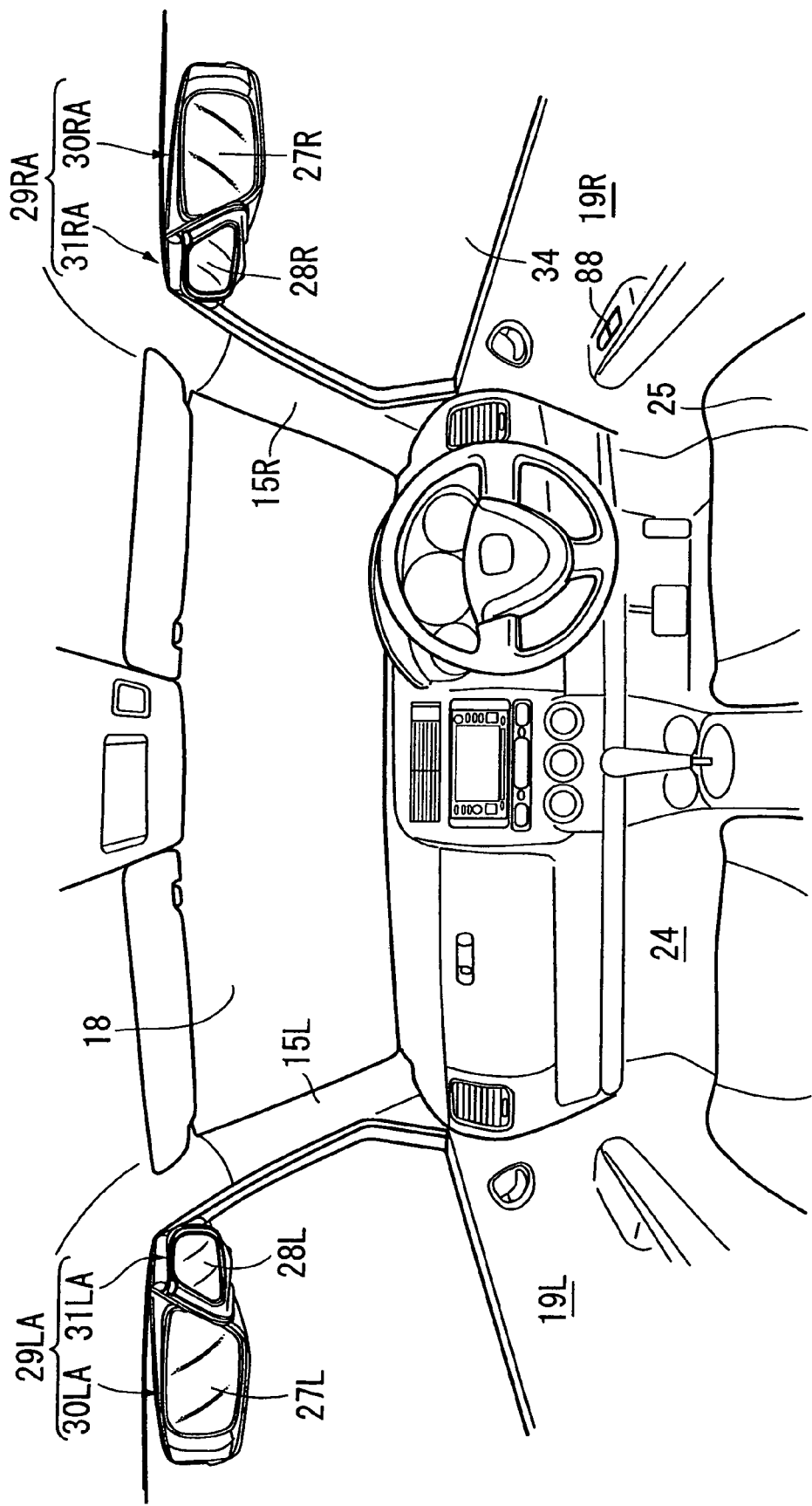
FIG. 2 is a perspective view showing a state when looking forward from the inside of the vehicle compartment of the passenger motor vehicle (first embodiment).
Figure 3:
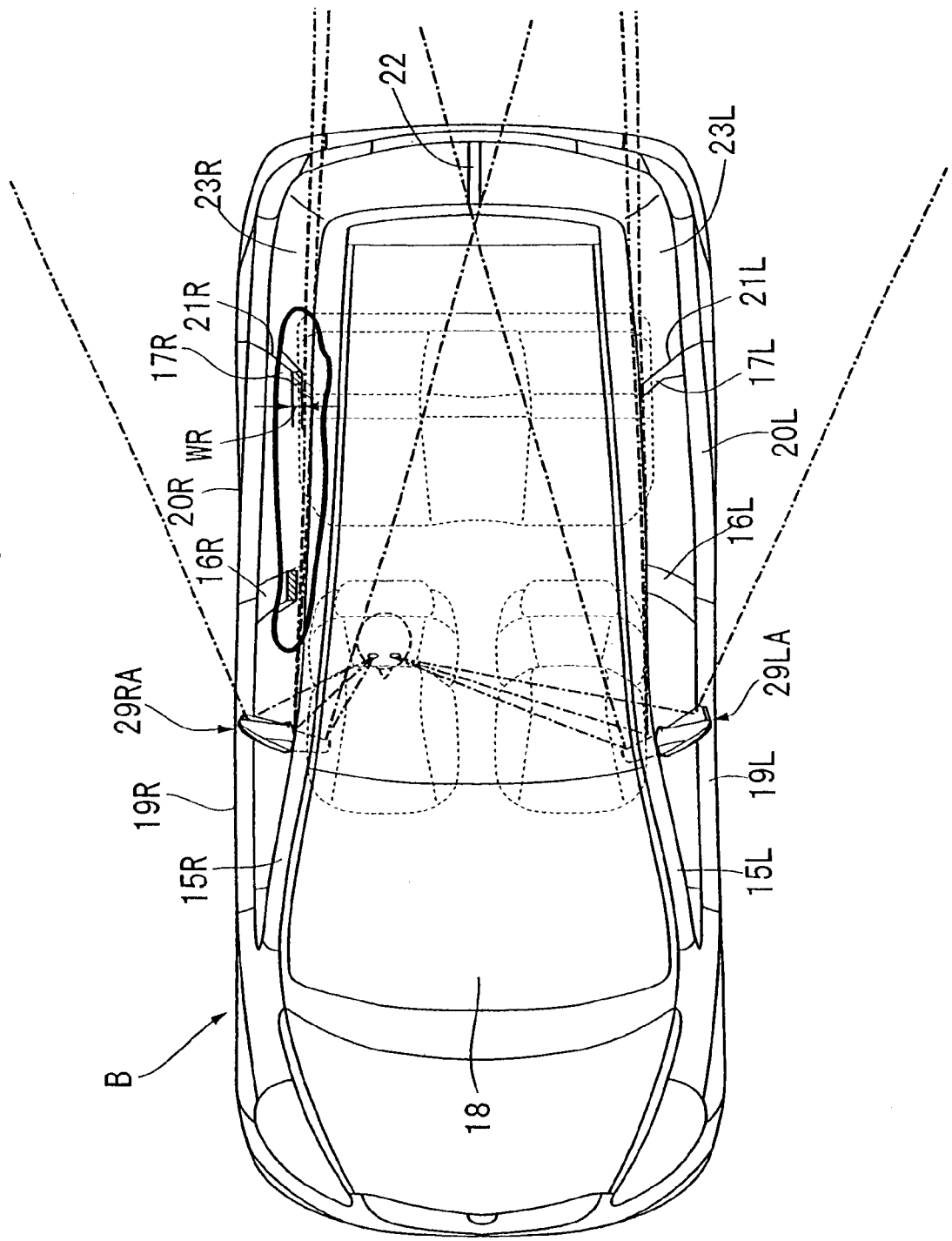
FIG. 3 is a partially cutaway plan view of the passenger motor vehicle (first embodiment).

The lateral movement operation switch 85 and the vertical movement operation switch 86, together with a left-right changeover switch 87 for determining which of the left integrated mirror system 29LA and the right integrated mirror system 29RA is selected, form an operation section 88, and the operation section 88 is disposed in the vicinity of the driver's seat 25 within the vehicle compartment 24, for example, as shown in FIG. 2 on an inner face of the right front side door 19R.

The control unit 89 includes a signal input discrimination circuit 90, and first and second motor drive circuits 91 and 92 for individually operating the first and second electric motors 77 and 78 in response to an output signal from the signal input discrimination circuit 90.

When a signal indicating that the left-right changeover switch 87 has selected the right integrated mirror system 29RA is inputted, the signal input discrimination circuit 90 inputs, based on an input signal from the lateral movement operation switch 85 and the vertical movement operation switch 86, a signal for operating the corresponding one of the first and second electric motors 77 and 78 into the corresponding one of the first and second motor drive circuits 91 and 92.

Mounted on a front upper part of the left front side door 19L forming part of the vehicle body B is the left integrated mirror system 29LA, which is formed from a outside unit 30LA having the outside mirror 27L disposed outside the vehicle compartment 24 and a inside unit 31LA having the inside mirror 28L disposed within the vehicle compartment 24 at a position in the vicinity of the outside mirror 27L so that, in cooperation with the outside mirror 27L, a vehicle rear field of vision is obtained. The arrangement of this left integrated mirror system 29LA and remote drive means related to the left integrated mirror system 29LA is basically the same as that of the right integrated mirror system 29RA and the remote drive means 84, and a detailed explanation thereof is omitted.

The operation of this first embodiment is now explained. The left and right integrated mirror systems 29LA and 29RA are mounted on the support plate 33 provided on the front upper part of the door sash 32 of the left and right front side doors 19L and 19R forming part of the vehicle body B, and in these left and right integrated mirror systems 29LA and 29RA, the swing support portion 63 swingably supporting the outside mirror 27L, 27R and the inside mirror 28L, 28R is provided on the bracket 35 mounted on the support plate 33, and the outside housing 36 covering the outside mirror 27L, 27R from the front side of the vehicle is also mounted on the bracket 35.

Wind pressure accompanying vehicle travel therefore does not impinge directly on the outside mirrors 27L and 27R, the force supporting the outside mirrors 27L and 27R and the inside mirrors 28L and 28R need only be relatively small, only a small force is therefore required for adjusting the swing angle of the outside mirrors 27L and 27R and the inside mirrors 28L and 28R, and the swing angle of the outside mirrors 27L and 27R and the inside mirrors 28L and 28R can be easily adjusted. Furthermore, not only is the outside housing 36 mounted on the bracket 35 but also the actuator case 38 having the swing support portion 63 for swingably supporting the outside mirror 27L, 27R and the inside mirror 28L, 28R is mounted thereon, and it is therefore possible to reduce the number of components to be combined, and reduce the variation when assembling components.

Moreover, since the mirror holder 46 retaining the outside mirror 27L, 27R and the inside mirror 28L, 28R is swingably supported on the swing support portion 63, and the through hole 59, through which the holder plate 40 of the mirror holder 46 runs, is provided in the support plate 33, assembly of the bracket 35 onto the support plate 33 is easy.

Furthermore, since the protruding portion 41*a*, which is provided integrally with the outside seal member 41 disposed between the support plate 33 and the bracket 35, is provided between the support plate 33 and the holder plate 40 so as to block the through hole 59, it is possible to prevent air or rainwater from flowing between the interior and exterior of the vehicle compartment 24 without interfering with the swing operation of the holder plate 40.

Moreover, since the bracket 35 is mounted on the support plate 33 from the outside of the vehicle compartment 24, when mounting the bracket 35 on the support plate 33, it is not obstructed by components forming the vehicle body, and the operation of mounting the bracket 35 on the support plate 33 is easy.

Furthermore, since the lateral width of a vertically intermediate section of the inside mirrors 28L and 28R is set at 50 mm or greater but smaller than the value that causes reflection of the vehicle driver, when viewing the inside mirrors 28L and 28R the minimum necessary field of vision is ensured for any vehicle driver and a rear image can be viewed stereoscopically, and the sensation of perspective is not impaired.

According to 'Japanese Anthropometric Data' published by the Research Institute of Human Engineering for Quality Life in October 1997, the minimum value for the pupillary distance between the two eyes of a person with an age of 18 years or older, which is the age for obtaining a vehicle driving license, is 50.2 mm, which is for 20 to 24 year-old females; by setting the minimum value for the lateral width on the vertically intermediate section of the inside mirrors 28L and 28R at 50 mm, it is possible for any vehicle driver to ensure a minimum necessary field of vision by means of the inside mirrors 28L and 28R. By setting the maximum value for the lateral width on the vertically intermediate section of the inside mirrors 28L and 28R so as to be smaller than a value that allows the vehicle driver to be reflected thereon, a blind spot can be prevented from being caused by the reflection of the vehicle driver, thereby enhancing the visibility.

Furthermore, since the inside housing 39 covering the inside mirror 28L, 28R from the front side is disposed within the projection area when the vehicle driver views the outside housing 36 covering the outside mirror 27L, 27R from the front side of the vehicle, there is no area that becomes a blind spot due to the inside housing 39, and the blind spot area is minimized to that caused by the outside mirror 27L, 27R.

In addition thereto, since one of the upper edges and the lower edges of the outside mirror 27L, 27R and the inside mirror 28L, 28R, in this embodiment the upper edges, are substantially aligned on the imaginary line IL, the fields of vision obtained by the inside mirror 28L, 28R and the outside mirror 27L, 27R are substantially aligned on at least one of the upper edge and the lower edge, and when the rear field of vision is momentarily checked, it can be carried out without an uncomfortable sensation.

Furthermore, since the outside mirror 27L, 27R and the inside mirror 28L, 28R are formed in curved shapes having the same center of curvature C and the same radius of curvature R, it is possible to obtain a wider field of vision by forming the outside mirror 27L, 27R and the inside mirror 28L, 28R in the curved shapes, and it becomes possible to view images obtained by the two mirrors 27L, 27R; 28L, 28R continuously without an uncomfortable sensation.

The vehicle body B is formed so that the vehicle width of its upper part is narrower than the vehicle width of its lower part, and since the left and right integrated mirror systems 29LA and 29RA are mounted on the front upper part of the door sash 32 of the left and right front side doors 19L and 19R forming part of the vehicle body B so that the outside units 30LA and 30RA are disposed within the maximum vehicle width of the vehicle body B, a sufficient rear field of vision is obtained even by disposing the outside units 30LA and 30RA within the maximum vehicle width of the vehicle body B; this can prevent the overall width of the vehicle from increasing due to the outside mirrors 27L and 27R and, in particular, it is not essential for the outside units 30LA and 30RA to have a retractable structure, thus simplifying the mirror structure. It is also easy to drive on a narrow road.

Furthermore, among the plurality of pillars provided on opposite sides of the vehicle body B, the left and right rear pillars 17L and 17R, which are the rearmost pillars, are at the rearmost position among members forming the vehicle body B within the rear field of vision given by the outside mirrors 27L and 27R and the inside mirrors 28L and 28R, and by positioning the left and right rear pillars 17L and 17R forward of left and right corners of the rearmost part of the vehicle compartment 24, the blind spot within the rear field of vision given by the outside mirrors 27R and 27L and the inside mirrors 28L and 28R can be minimized, and a sufficiently wide rear field of vision can be obtained.

Moreover, since the pillar 22 supporting one side of the rear glasses 23L and 23R having the other side supported by the rear pillars 17L and 17R, which are the rearmost pillars, is provided in the laterally intermediate section of the rear part of the vehicle body B, it is necessary to form the rear glasses 23L and 23R in a curved shape so as to occupy the left and right corners of the rearmost part of the vehicle compartment 24, and such rear glasses 23L and 23R can be retained by the pillar 22 disposed in the laterally intermediate section of the rear part of the vehicle body B.

Furthermore, since the cross-sectional width WR in the vehicle width direction of the left and right rear pillars 17L and 17R is set in a range such that they are hidden behind the left and right center pillars 16L and 16R within the field of vision given by the outside mirrors 27L and 27R and the inside mirrors 28L and 28R, the blind spot generated by the plurality of pillars 15L to 17L and 15R to 17R disposed on opposite sides of the vehicle body B can be minimized.

Moreover, since the reflection angle of the outside mirrors 27L and 27R and the inside mirrors 28L and 28R can be changed by remote operation, it is possible to easily make the reflection angle, relative to the vehicle driver, of the outside mirrors 27L and 27R and the inside mirrors 28L and 28R match the vehicle driver.

Furthermore, the remote drive means 84 for changing the reflection angle of the outside mirror 27L, 27R and the inside mirror 28L, 28R by remote operation includes the lateral movement operation switch 85 and the vertical movement operation switch 86 enabling manual operation by the vehicle driver on the driver's seat 25, the first and second electric motors 77 and 78 supported on the actuator case 38 so as to exert a motive power for swinging the mirror holder 46 in order to change the reflection angle, and the control unit 89 for controlling the operation of the first and second electric motors 77 and 78 in response to operation of the lateral movement operation switch 85 and the vertical movement operation switch 86, and by controlling the operation of the first and second electric motors 77 and 78 in response to manual operation of the lateral movement operation switch 85 and the vertical movement operation switch 86 by the vehicle driver, the reflection angle of the outside mirror 27L, 27R and the inside mirror 28L, 28R relative to the vehicle driver can be changed very easily.

Moreover, since the swing center C1 of the mirror holder 46 is set in the vicinity of a part of the actuator case 38 mounted on the vehicle body B between the outside mirror 27L, 27R and the inside mirror 28L, 28R, when the outside mirror 27L, 27R and the inside mirror 28L, 28R are moved, an uncomfortable sensation is not caused in the field of vision given by cooperation of the two mirrors 27L, 28L; 27R, 28R.

Furthermore, since the position of the center of gravity of the overall combination of the outside mirror 27L, 27R and the inside mirror 28L, 28R and the mirror holder 46 retaining these mirrors 27L, 27R; 28L, 28R in common is set at the same position as that of the swing centers C1 of the mirror holders 46, it is possible to lessen the influence of vibration from the vehicle body B side on the outside mirrors 27L and 28L and the outside mirrors 27R and 28R.

Embodiment 2

Figure 12:
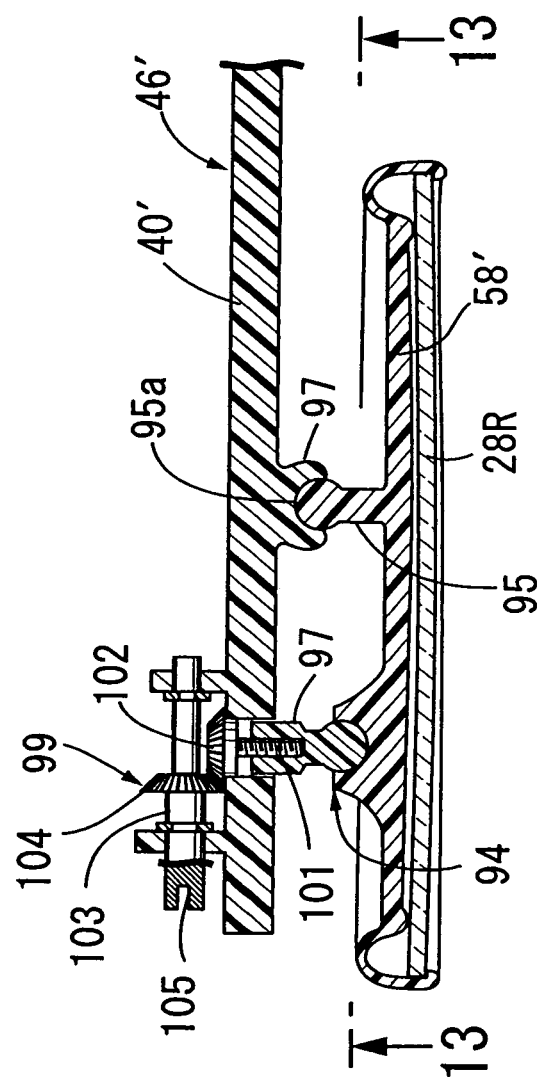
FIG. 12 is a sectional view along line 12-12 in FIG. 13, and is a transverse sectional view of a mirror holder in the vicinity of a inside mirror (second embodiment).
Figure 13:
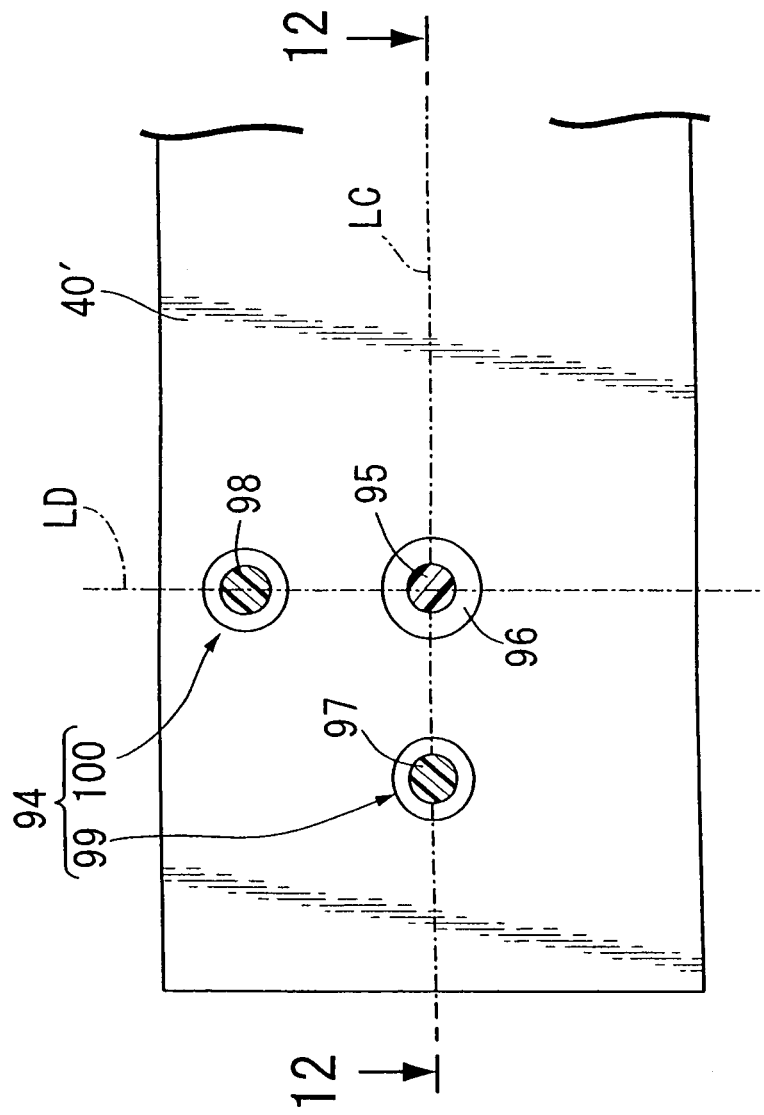
FIG. 13 is a sectional view along line 13-13 in FIG. 12 (second embodiment).

A second embodiment of the present invention is explained by reference to FIG. 12 and FIG. 13; a mirror holder 46' includes a holder plate 40' that is disposed in common for a outside mirror 27R (see first embodiment) and a inside mirror 28R. The holder plate 40' is coupled to first and second electric motors 77, 78 (see first embodiment) of remote drive means 84, and is swingably supported on an actuator case 38 (see first embodiment). The mirror holder 46' also includes an outside retaining member 57 (see first embodiment) that retains the outside mirror 27R and engages with the holder plate 40', and an inside retaining member 58 (see first embodiment) that retains the inside mirror 28R and is swingably supported on the holder plate 40', fine adjustment drive means 94 for finely adjusting the reflection angle of one of the outside mirror 27R and the inside mirror 28R, that is, the inside mirror 28R, being provided between the holder plate 40' and the inside retaining member 58.

A support shaft 95 projecting on the holder plate 40' side is projectingly provided integrally with a section in substantially the middle of the reverse side of the inside retaining member 58' facing the holder plate 40', and a spherical head portion 95a provided at the extremity of the support shaft 95 is swingably fitted into a support portion 96 provided on the holder plate 40'.

The fine adjustment drive means 94 is formed from a horizontal direction adjustment operation mechanism 99 and a vertical direction adjustment operation mechanism 100, the horizontal direction adjustment operation mechanism 99 being manually operable so as to axially move back and forth a horizontal direction drive shaft 97 having its axis disposed on a horizontal straight line LC passing through the support portion 96 and having one end part swivelably coupled to the reverse side of the inside retaining member 58', and the vertical direction adjustment operation mechanism 100 being manually operable so as to axially move back and forth a vertical direction drive shaft 98 having its axis disposed on a vertical line LD passing through the support portion 96.

The horizontal direction adjustment operation mechanism 99 includes a threaded shaft 101 coaxially screwed into the other end part of the horizontal direction drive shaft 97, a driven bevel gear 102 provided integrally with the threaded shaft 101 and rotatably supported on the holder plate 40', an operation shaft 103 having its axis perpendicular to the axis of the threaded shaft 101 and being rotatably supported on the holder plate 40', and a drive bevel gear 104 provided integrally with the operation shaft 103 and meshing with the driven bevel gear 102; an engagement groove 105 is provided at one end part of the operation shaft 103, a tool such as a screwdriver inserted through a gap between a inside housing 39 (see first embodiment) and the mirror holder 46' engaging with the engagement groove 105.

In accordance with such a horizontal direction adjustment operation mechanism 99, rotating the operation shaft 103 so as to axially move the horizontal direction drive shaft 97 enables the inside retaining member 58' and the inside mirror 28R to be made to swing within a horizontal plane containing the horizontal straight line LC.

Furthermore, the vertical direction adjustment operation mechanism 100 is arranged in the same manner as for the horizontal direction adjustment operation mechanism 99 so that engaging and rotating a tool such as a screwdriver inserted through a gap between the inside housing 39 (see first embodiment) and the mirror holder 46' moves the vertical direction drive shaft 98 axially back and forth.

In accordance with this second embodiment, it is possible to finely adjust the reflection angle of the inside mirrors 28L and 28R according to variations in the dimensions of components forming the integrated mirror system or to individual differences between vehicle drivers.

Embodiment 3

Figure 14:
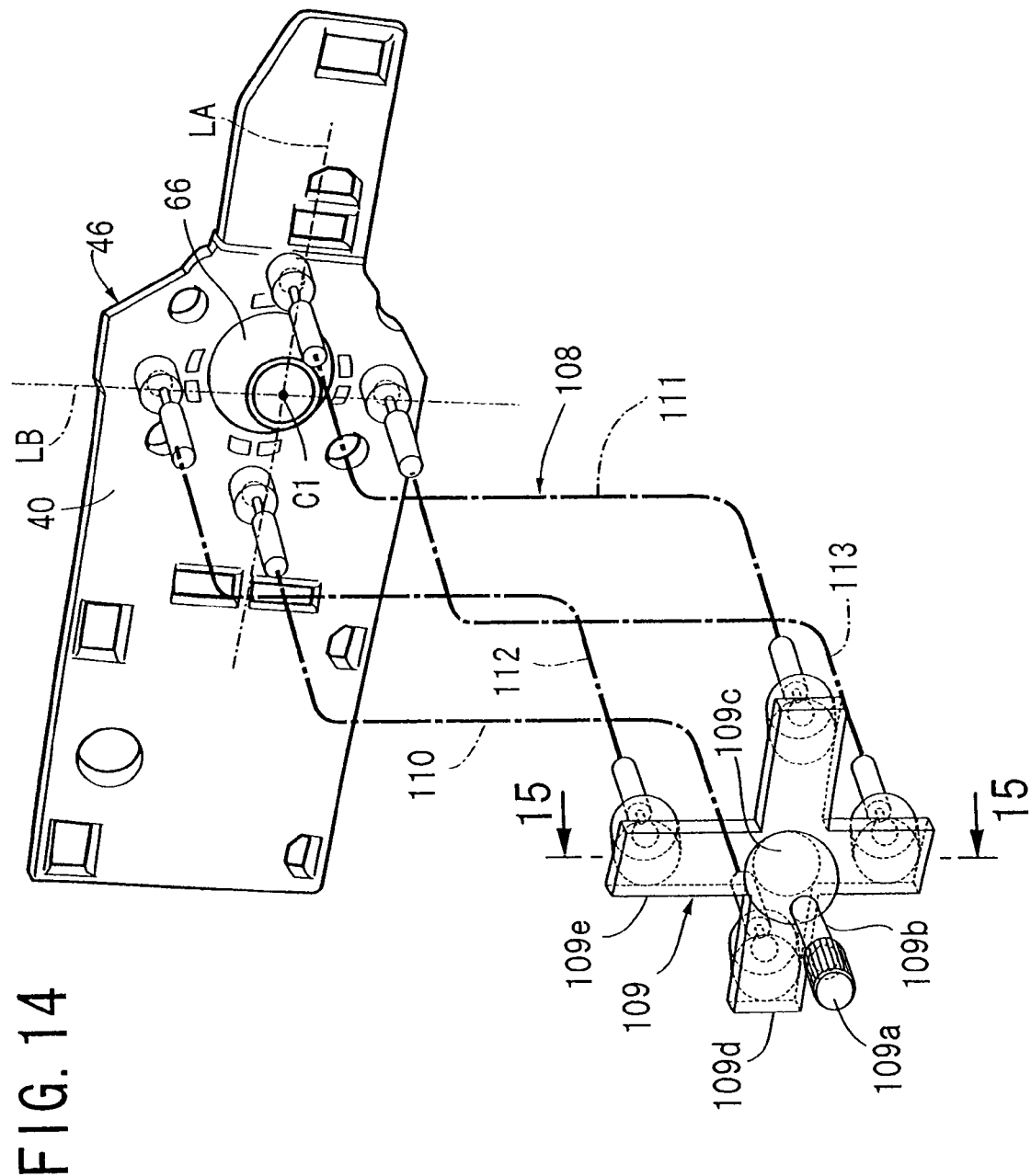
FIG. 14 is a perspective view showing the arrangement of remote drive means (third embodiment).

A third embodiment of the present invention is explained by reference to FIG. 14 and FIG. 15; a holder plate 40 of a mirror holder 46 is made to swing by remote drive means 108, and the remote drive means 108 is formed by coupling between a remote operation member 109 and the holder plate 40 with four wires 110, 111, 112, and 113; these are transmission members enabling an operating force of the remote operation member 109, which is manually operable by a vehicle driver on a driver's seat 25 (see first embodiment), to be directly transmitted to the holder plate 40 of the mirror holder 46.

The remote operation member 109 includes a knob portion 109a for the vehicle driver to hold, a shaft portion 109b having one end coaxially connected to the knob portion 109a, a spherical portion 109c coaxially connected to the other end of the shaft portion 109b, a first coupling arm portion 109d having a middle part connected to the spherical portion 109c on the side opposite to the shaft portion 109b and extending in a straight line, and a second coupling arm portion 109e connected to the intermediate section of the first coupling arm portion 109d at right angles and extending in a straight line.

Figure 15:
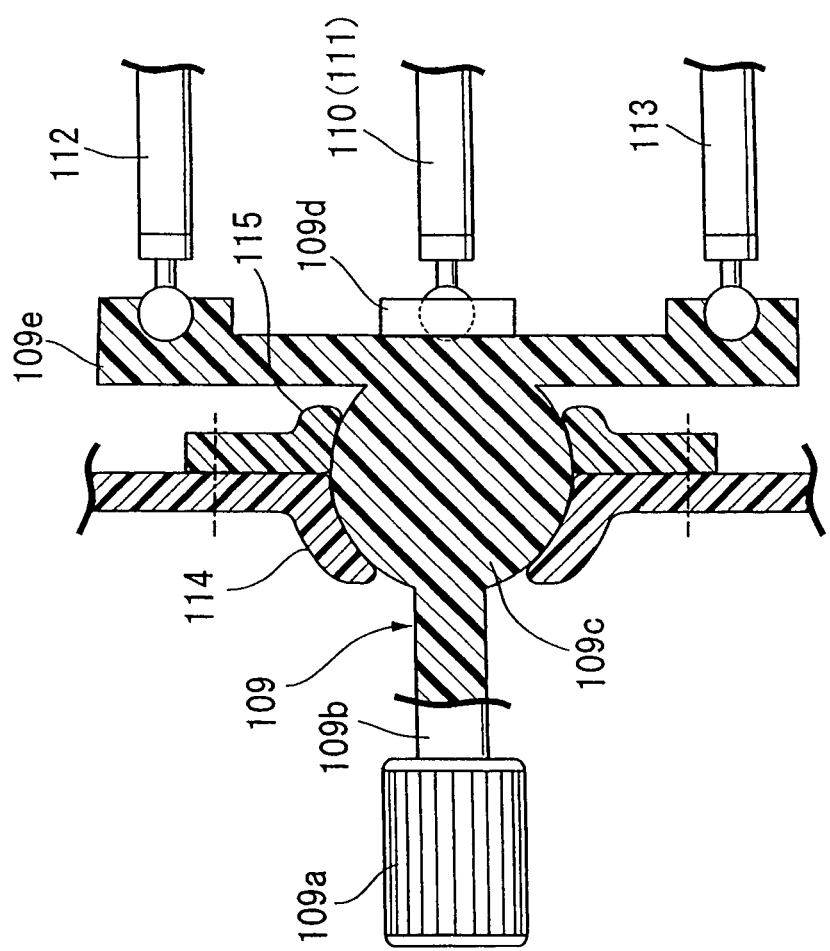
FIG. 15 is a sectional view along line 15-15 in FIG. 14 of a support portion for a remote operation member (third embodiment).

As clearly shown in FIG. 15, the spherical portion 109c is swingably retained between a support member 114 provided on the vehicle body B in the vicinity of the driver's seat 25 and a retaining member 115 mounted on the support member 114, and the remote operation member 109 is retained and supported between the support member 114 and the retaining member 115 so that it can swing within a plane passing through the center of the spherical portion 109c and containing the longitudinally central line of the first coupling arm portion 109d and within a plane passing through the center of the spherical portion 109c and containing the longitudinally central line of the second coupling arm portion 109e.

Ends of the wires 110 and 111 at one end are coupled to opposite ends of the first coupling arm portion 109d, and the other ends of the two wires 110 and 111 are coupled to the holder plate 40 at positions that are on a first straight line LA passing through a swing center C1 of the holder plate 40 of the mirror holder 46 and extending horizontally, and are equally spaced on opposite sides of the swing center C1. Ends of the wires 112 and 113 at one end are coupled to opposite ends of the second coupling arm portion 109e, and the other ends of the two wires 112 and 113 are coupled to the holder plate 40 at positions that are on a second straight line LB passing through the swing center C1 and extending vertically and are equally spaced on opposite sides of the swing center C1.

In accordance with this third embodiment, by swinging the remote operation member 109 within the plane passing through the center of the spherical portion 109c and containing the longitudinally central line of the first coupling arm portion 109d, the holder plate 40 of the mirror holder 46 swings laterally, and by swinging the remote operation member 109 within the plane passing through the center of the spherical portion 109c and containing the longitudinally central line of the second coupling arm portion 109e, the holder plate 40 of the mirror holder 46 swings vertically.

That is, the reflection angle, relative to the vehicle driver, of outside mirrors 27L and 27R (see first embodiment) and inside mirrors 28L and 28R (see first embodiment) can be changed by an operating force when the vehicle driver manually operates the remote operation member 109.

As another embodiment of the present invention, each of the wires 110 to 113 of the remote drive means 108 in the above third embodiment may be coupled to the holder plate 40' of the mirror holder 40' in the second embodiment.

Embodiment 4

Figure 16:
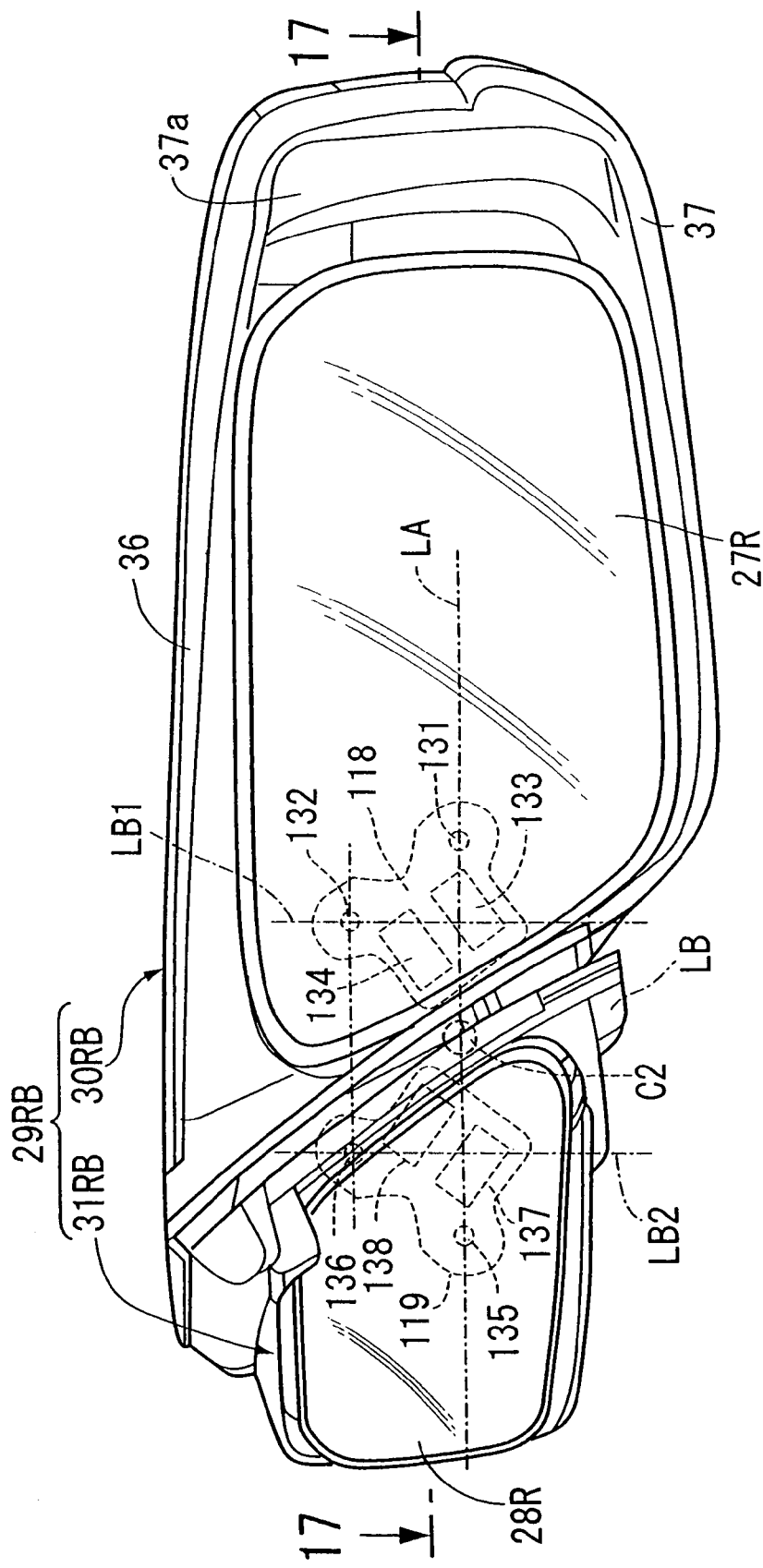
FIG. 16 is a view of a right integrated mirror system from the rear side of a vehicle (fourth embodiment).
Figure 17:
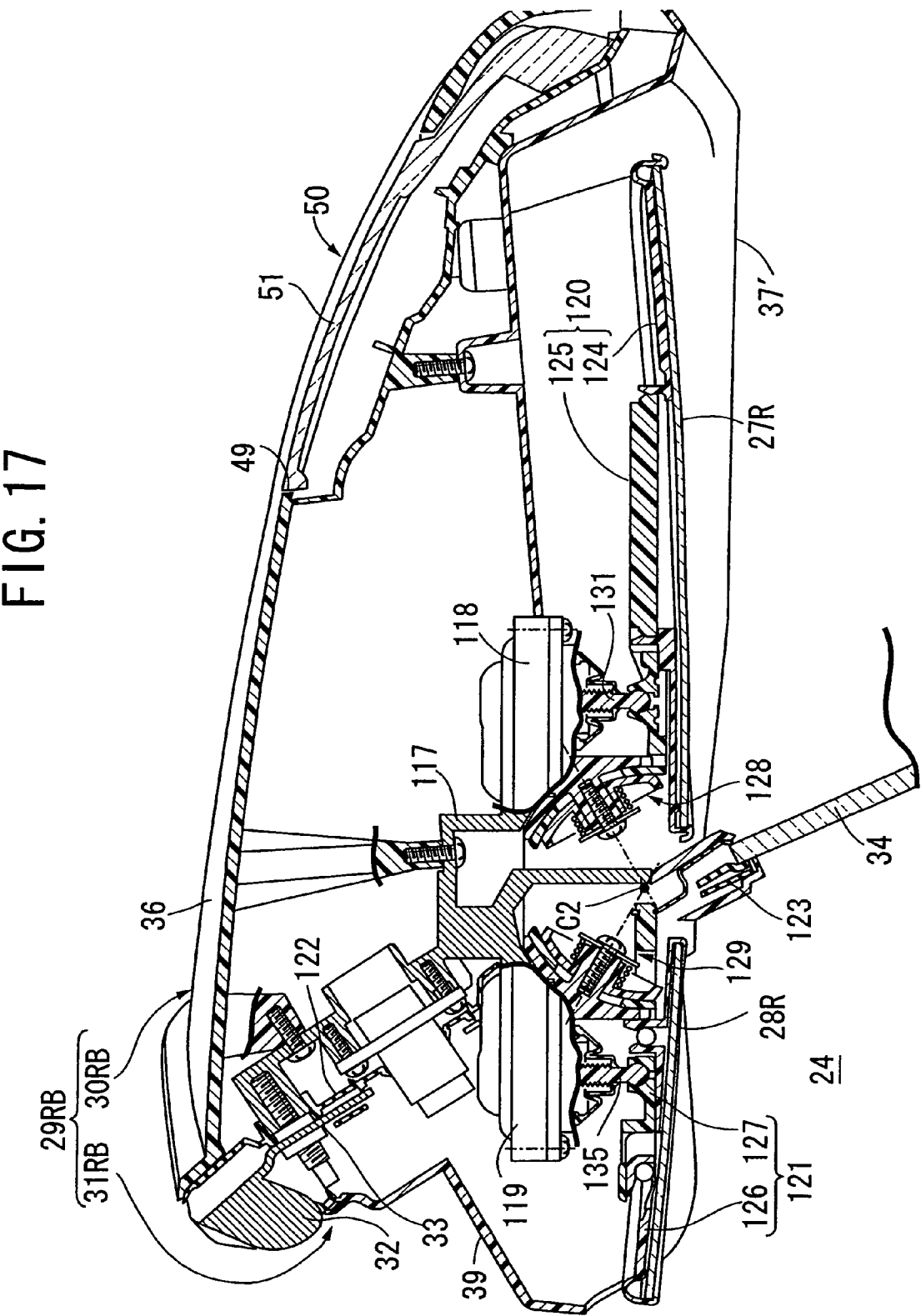
FIG. 17 is a sectional view along line 17-17 in FIG. 16 (fourth embodiment).

A fourth embodiment of the present invention is explained by reference to FIG. 16 to FIG. 18; a right integrated mirror system 29RB has a outside unit 30RB and a inside unit 31RB, and is mounted on a support plate 33 provided on a front upper part of a door sash 32 of a right front side door 29R.

The outside unit 30RB includes a bracket 117 mounted on the support plate 33, a outside housing 36 mounted on the bracket 117, a visor 37' mounted on the outside housing 36, an outside actuator case 118 as mirror support means fixed to the bracket 117, and a outside mirror 27R disposed within the visor 37' so as to provide a view to the rear of the vehicle, and the inside unit 31RB includes a inside housing 39 mounted on the support plate 33, an inside actuator case 119 as mirror support means fixed to the bracket 117, and a inside mirror 28R disposed within the inside housing 39 so as to provide a view to the rear of the vehicle, the outside mirror 27R being retained by an outside mirror holder 120 swingably supported on the outside actuator case 118, and the inside mirror 28R being retained by an inside mirror holder 121 swingably supported on the inside actuator case 119.

The bracket 117 is mounted from the outside of the vehicle compartment 24 on the support plate 33 with an outside seal member 122 disposed between itself and the support plate 33. An inside seal member 123 is disposed between a synthetic resin inside housing 39 and an inner face of the support plate 33 facing the vehicle compartment 24 side, the inside housing 39 covering the inside mirror 28R from the front side of the vehicle. Moreover, part of the bracket 117 runs through the outside seal member 122 and the inside seal member 123 and extends toward the inside housing 39 side.

The outside mirror holder 120 is formed by engagement of an outside retaining member 124 retaining the outside mirror 27R with an outside holder plate 125, the inside mirror holder 121 is formed by engagement of an inside retaining member 126 retaining the inside mirror 28R with an inside holder plate 127, and the outside seal member 122 is connected to the inside holder plate 127.

The outside holder plate 125 of the outside mirror holder 120 is vertically and laterally swingably supported by an outside swing support portion 128 provided on the outside actuator case 118 fixed to the bracket 117, and this outside swing support portion 128 is formed so as to have basically the same structure as that of the swing support portion 63 of the first embodiment.

Furthermore, the inside holder plate 127 of the inside mirror holder 121 is vertically and laterally swingably supported by an inside swing support portion 129 provided on the inside actuator case 119 fixed to the bracket 117, and this inside swing support portion 129 is formed so as to have basically the same structure as that of the swing support portion 63 of the first embodiment and that of the outside swing support portion 128.

In this way, the outside mirror holder 120 retaining the outside mirror 27R is vertically and laterally swingably supported by the outside swing support portion 128 of the outside actuator case 118, and the inside mirror holder 121 retaining the inside mirror 28R is vertically and laterally swingably supported by the inside swing support portion 129 of the inside actuator case 119; a swing center C2 is set so as to be the same for the outside swing support portion 128 and the inside swing support portion 129 and, moreover, the swing center C2 is set between the outside mirror 27R and the inside mirror 28R in the vicinity of a part where the outside and inside actuator cases 118 and 119 are mounted on the vehicle body B, that is, a part of the bracket 117 mounted on the support plate 33.

Furthermore, an outside first drive shaft 131 having its axis disposed on a horizontal first straight line LA passing through the swing center C2 and an outside second drive shaft 132 having its axis disposed on an outside second straight line LB1 extending vertically at right angles to the first straight line LA axially movably project from the outside actuator case 118. Outside drive means 149 for making the outside mirror holder 120 swing is formed from an outside first electric motor 133 that exerts a motive power for axially driving the outside first drive shaft 131 back and forth and an outside second electric motor 134 that exerts a motive power for axially driving the outside second drive shaft 132 back and forth, and the outside first electric motor 133 and the outside second electric motor 134 are housed in and fixed to the outside actuator case 118.

One end part of the outside first drive shaft 131 is coupled to the outside holder plate 125 of the outside mirror holder 120 so that it can swivel within a plane containing the first straight line LA, and one end part of the outside second drive shaft 132 is coupled to the outside holder plate 125 of the outside mirror holder 120 so that it can swivel within a plane containing the outside second straight line LB1. When the outside first drive shaft 131 is axially moved by operation of the outside first electric motor 133, the outside mirror holder 120, that is, the outside mirror 27R, swings laterally around the swing center C2 of the outside swing support portion 128, and when the outside second drive shaft 132 is axially moved by operation of the outside second electric motor 134, the outside mirror holder 120, that is, the outside mirror 27R, swings vertically around the swing center C2 of the outside swing support portion 128.

Furthermore, an inside first drive shaft 135 having its axis disposed on a horizontal first straight line LA passing through the swing center C2 and an inside second drive shaft 136 having its axis disposed on an inside second straight line LB2 extending vertically at right angles to the first straight line LA axially movably project from the inside actuator case 119. Inside drive means 150 for making the inside mirror holder 121 swing is formed from an inside first electric motor 137 that exerts a motive power for axially driving the inside first drive shaft 135 back and forth and an inside second electric motor 138 that exerts a motive power for axially driving the inside second drive shaft 136 back and forth, and the inside first electric motor 137 and the inside second electric motor 138 are housed in and fixed to the inside actuator case 119.

One end part of the inside first drive shaft 135 is coupled to the inside holder plate 127 of the inside mirror holder 121 so that it can swivel within a plane containing the first straight line LA, and one end part of the inside second drive shaft 136 is coupled to the inside holder plate 127 of the inside mirror holder 121 so that it can swivel within a plane containing the inside second straight line LB2. When the inside first drive shaft 135 is axially moved by operation of the inside first electric motor 137, the inside mirror holder 121, that is, the inside mirror 28R, swings laterally around the swing center C2 of the inside swing support portion 129, and when the inside second drive shaft 136 is axially moved by operation of the inside second electric motor 138, the inside mirror holder 121, that is, the inside mirror 28R, swings vertically around the swing center C2 of the inside swing support portion 129.

Figure 18:
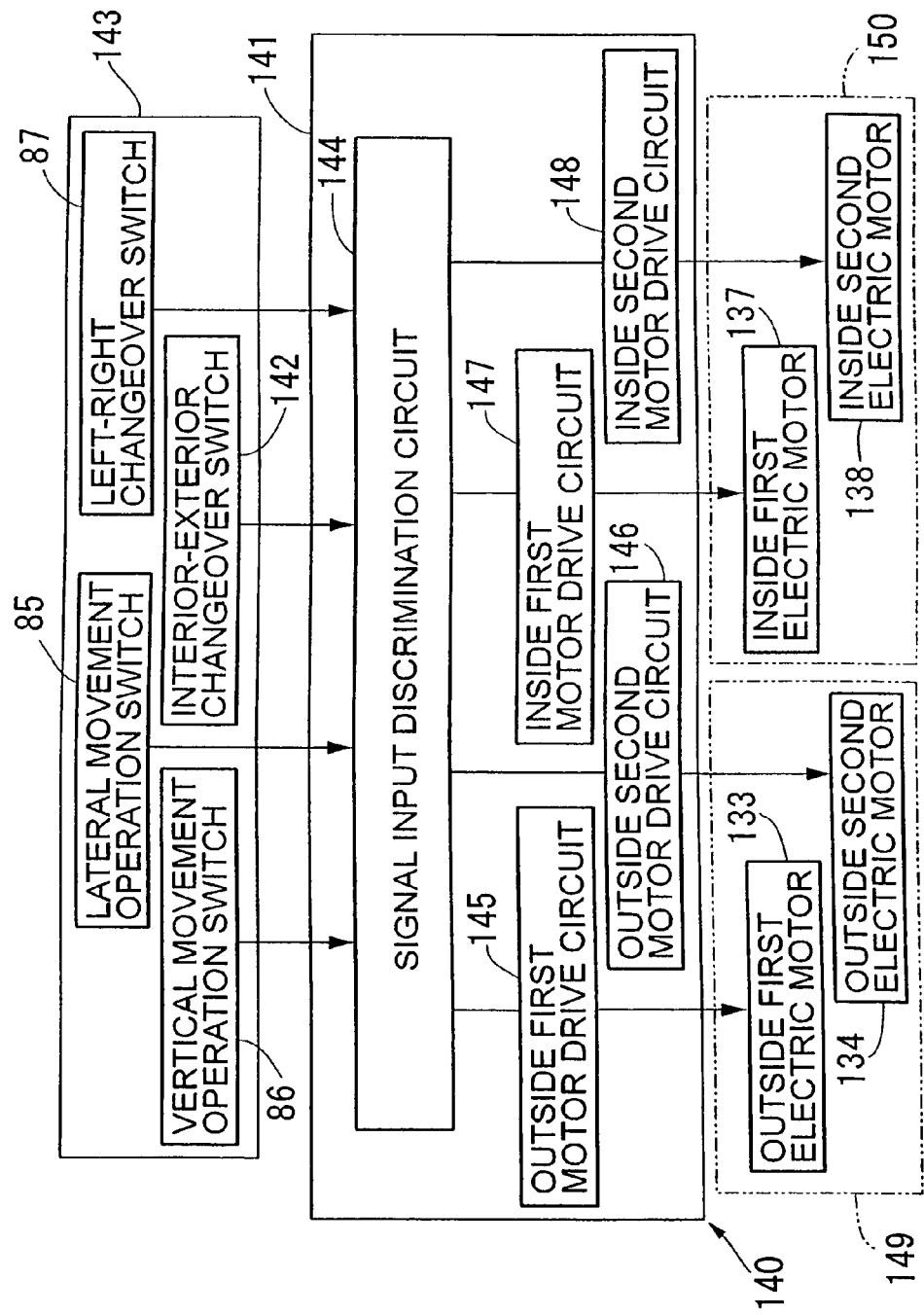
FIG. 18 is a block diagram showing the arrangement of remote drive means (fourth embodiment).

In FIG. 18, the outside and inside mirror holders 120 and 121 separately retaining the outside mirror 27R and the inside mirror 28R respectively are made to swing by remote operation by remote drive means 140 in order to change the reflection angle of the outside mirror 27R and the inside mirror 28R.

In a section related to the right integrated mirror system 29RB, the remote drive means 140 includes the outside first electric motor 133 that exerts a drive force for laterally swinging the outside mirror 27R, the outside second electric motor 134 that exerts a drive force for vertically swinging the outside mirror 27R, the inside first electric motor 137 that exerts a drive force for laterally swinging the inside mirror 28R, the inside second electric motor 138 that exerts a drive force for vertically swinging the inside mirror 28R, a lateral movement operation switch 85, which is a first remote operation member enabling manual operation by a vehicle driver on a driver's seat 25 (see first embodiment), a vertical movement operation switch 86, which is a second remote operation member enabling manual operation by the vehicle driver on the driver's seat 25, and a control unit 141 controlling the operation of each of the electric motors 133, 134, 137, and 138 in response to operation of the lateral movement operation switch 85 and the vertical movement operation switch 86.

The lateral movement operation switch 85 and the vertical movement operation switch 86, together with a left-right changeover switch 87 for determining which one of the left integrated mirror system and the right integrated mirror system 29RB is selected and an interior-exterior changeover switch 142 for changing over between common operation and individual operation of the outside mirror 27R and the inside mirror 28R, form an operation section 143, and this operation section 143 is disposed in the vicinity of the driver's seat 25 within the vehicle compartment 24.

The control unit 141 includes a signal input discrimination circuit 144, and an outside first motor drive circuit 145, an outside second motor drive circuit 146, an inside first motor drive circuit 147, and an inside second electric motor drive circuit 148 that individually drive the respective electric motors 133, 134, 137, and 138 in response to an output signal from the signal input discrimination circuit 144.

In a state in which a signal indicating that the left-right changeover switch 87 has selected the right integrated mirror system 29RB, the signal input discrimination circuit 144 selects a circuit to be operated among the motor drive circuits 145 to 148 in response to a signal inputted from the interior-exterior changeover switch 142, and inputs a signal for driving at least one of the electric motors 133, 134, 137 and 138 into the selected motor drive circuit based on the input signal from the lateral movement operation switch 85 and the vertical movement operation switch 86.

In accordance with this fourth embodiment, the outside mirror 27R and the inside mirror 28R are retained by the pair of mirror holders 120 and 121 respectively; these are swingably supported on the actuator cases 118 and 19 via the swing support portions 128 and 129, which are independent from each other.

It is therefore possible to change over as necessary between a state in which the outside mirror 27R and the inside mirror 28R are moved independently and a state in which they are moved simultaneously and, moreover, when either one of mechanisms for driving the outside mirror 27R and the inside mirror 28R malfunctions, it is possible to replace only the side that malfunctions.

Furthermore, since the two swing support portions 128 and 129 are set so as to have the same swing center C2, it is possible to prevent an uncomfortable sensation from being caused in the field of vision given by cooperation of the two mirrors 27R and 28R.

Moreover, controlling the operation of each of the electric motors 133, 134, 137, and 138 in response to a manual operation by the vehicle driver of the lateral movement operation switch 85 and the vertical movement operation switch 86 enables the reflection angle of the outside mirror 27R and the inside mirror 28R relative to the vehicle driver to be changed remarkably easily.

As a modified example of the above fourth embodiment, an actuator including an electric motor is directly mounted on the bracket 117, and the outside and inside mirror holders 120 and 121 may be swingably supported on a spherical swing support portion provided on the bracket 117.

Embodiment 5

Figure 19:
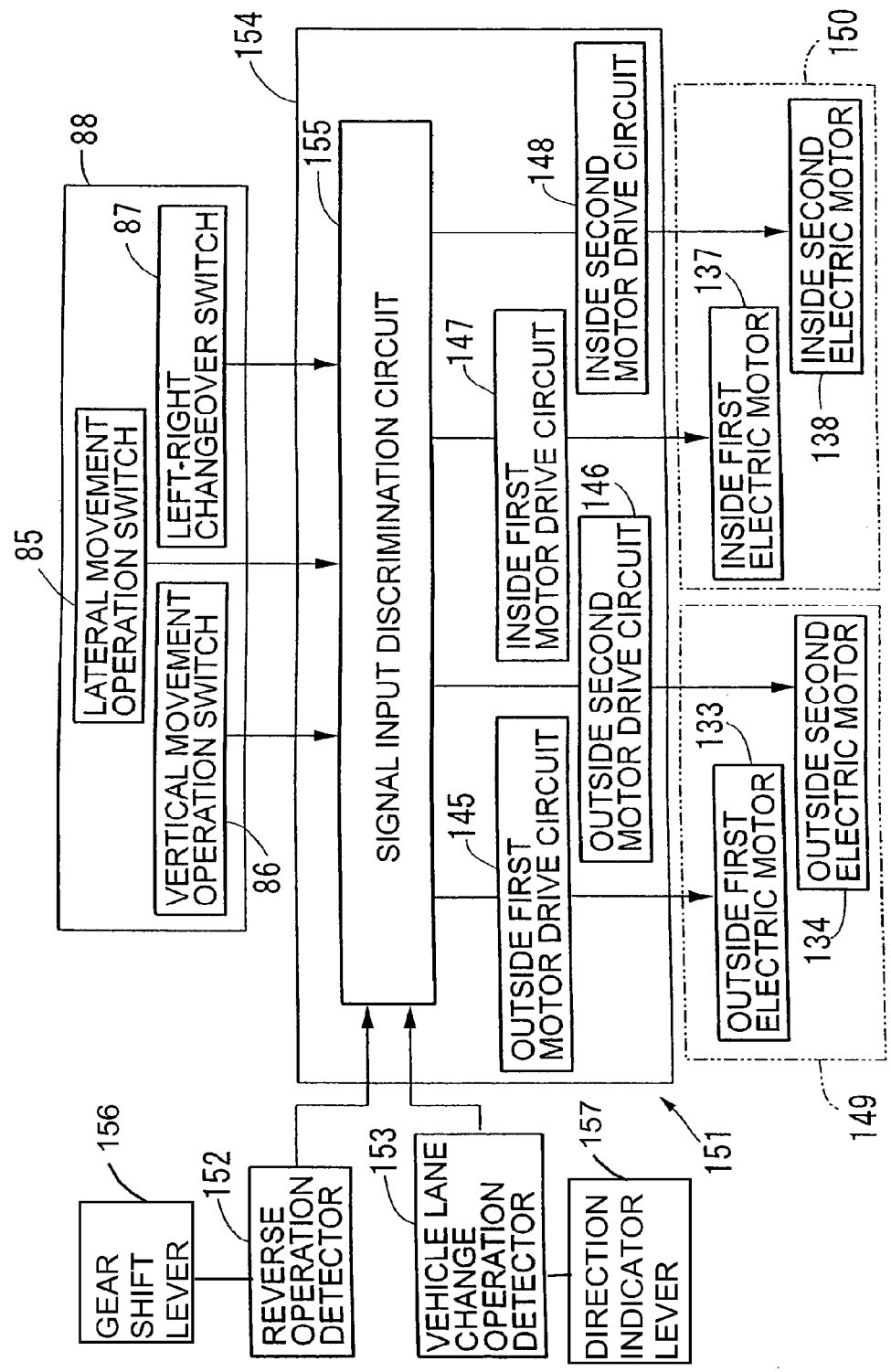
FIG. 19 is a block diagram showing the arrangement of remote drive means of a fifth embodiment of the present invention (fifth embodiment).

Instead of the remote drive means 140 of the above fourth embodiment, remote drive means 151 of a fifth embodiment shown in FIG. 19 may be used.

In a section related to a right integrated mirror system 29RB (see fourth embodiment), the remote drive means 151 includes an outside drive means (outside drive device) 149 for making a vehicle compartment exterior mirror 27R swing, an inside drive means (inside drive device) 150 for making a vehicle compartment interior mirror 28R swing, and a reverse operation detector 152 for detecting that a vehicle driver has operated a gear shift lever 156 to a reverse position. The gear shift lever 156 may be referred to as an operation device operated by the vehicle driver when reversing the vehicle. In this fifth embodiment, the remote drive means 151 also includes a vehicle lane change operation detector 153 for detecting to which side the vehicle driver has operated a direction indicator lever 157. The direction indicator lever 157 may be referred to as an operation device operated by the vehicle driver when changing a path of the vehicle. Further in this fifth embodiment, the remote drive means 151 also includes an operation section 88 as described above, and a control unit 154 which is provided for controlling the operation of first and second outside electric motors 133 and 134 in the outside drive means 149 and the operation of first and second inside electric motors 137 and 138 in the inside drive means 150 in response to a signal from the operation section 88, the reverse operation detector 152, and the vehicle lane change operation detector 153.

The control unit 154 includes a signal input discrimination circuit 155, and an outside first motor drive circuit 145, an outside second motor drive circuit 146, an inside first motor drive circuit 147, and an inside second motor drive circuit 148, which individually drive the respective electric motors 133, 134, 137, and 138 in response to an output signal from the signal input discrimination circuit 155.

Inputted into the signal input discrimination circuit 155 are not only signals from a left-right changeover switch 87, a lateral movement operation switch 85, and a vertical movement operation switch 86 of the operation section 88 but also signals from the reverse operation detector 152 and the vehicle lane change operation detector 153.

Moreover, in a state in which neither the reverse operation detector 152 nor the vehicle lane change operation detector 153 has detected a reverse operation or a vehicle lane change operation by the vehicle driver as well as in a state in which a signal indicating that the left-right changeover switch 87 has selected the right integrated mirror system 29RB is inputted, the signal input discrimination circuit 155 attains a normal operation control state in which the outside and inside drive means 149 and 150 are both operated so as to make the outside mirror holder 120 and the inside mirror holder 121 swing in association based on an input signal from the lateral movement operation switch 85 and the vertical movement operation switch 86, whereas when either of the reverse operation detector 152 and the vehicle lane change operation detector 153 has detected a reverse operation or a vehicle lane change operation by the vehicle driver, it changes over to a specific operation control state in which only the outside drive means 149 is operated so as to make the outside mirror holder 120 swing on its own.

In a specific operation control state in which the reverse operation detector 152 has detected a reverse operation by the vehicle driver, the signal input discrimination circuit 155 of the control unit 154 outputs a signal for operating only by a predetermined amount the outside second electric motor 134 of the outside drive means 149 toward the side that makes the direction the outside mirror 27R faces change downward only by a predetermined angle and, furthermore, in a specific operation control state in which the vehicle lane change operation detector 153 has detected a rightward vehicle lane change operation by the vehicle driver, the signal input discrimination circuit 155 of the control unit 154 outputs a signal for operating only by a predetermined amount the outside first electric motor 133 of the outside drive means 149 toward the side that makes the direction the outside mirror 27R faces change outward only by a predetermined angle.

Furthermore, when the signal input discrimination circuit 155 of the control unit 154 confirms from a signal from either of the reverse operation detector 152 or the vehicle lane change operation detector 153 that operation of the gear shift lever or operation of the direction indicator lever by the vehicle driver has completed, it outputs a signal for operating the outside first electric motor 133 or the outside second electric motor 134 of the outside drive means 149 so as to return the outside mirror holder 120 to the position it was in before the specific operation control state started.

In accordance with this fifth embodiment, the control unit 154 for controlling the operation of the outside drive means 149 for making the outside mirror holder 120 swing and the operation of the inside drive means 150 for making the inside mirror holder 121 swing can be changed over between the normal operation control state in which both the outside and inside drive means 149 and 150 are operated so as to make the outside mirror holder 120 and the inside mirror holder 121 swing in association and the specific operation control state in which only the outside drive means 149 is operated so as to make the outside mirror holder 120 swing on its own.

It is therefore possible to easily adjust the reflection angle of the outside mirror 27L, 27R and the inside mirror 28L, 28R by changing the reflection angle of the two mirrors 27L, 27R; 28L, 28R relative to the vehicle driver by operation of the outside drive means 149 and the inside drive means 150, and to change the side field of vision of the vehicle so as to better match the travel of the vehicle depending on the travel state of the vehicle.

Moreover, in response to operation of the gear shift lever operated by the vehicle driver when the vehicle is reversed the control unit 154 selects the specific operation control state, and operates the outside second electric motor 134 of the outside drive means 149 only by a predetermined amount toward the side that makes the direction the outside mirror 27L, 27R face change downward only by a predetermined angle; when the vehicle reverses, since the direction the outside mirror 27L, 27R face changes downward only by the predetermined angle, it is possible to move the vehicle side field of vision given by the outside mirror 27L, 27R further downward so as to better match the time when the vehicle reverses while maintaining the rear field of vision given by the inside mirror 28L, 28R, for which the reflection angle does not change when the vehicle reverses, without obtaining an unnecessary field of vision.

Furthermore, in response to operation of the direction indicator lever operated by the vehicle driver when changing the lane of the vehicle, the control unit 154 selects the specific operation control state and operates only by a predetermined amount the outside first electric motor 133 of the outside drive means 149 toward the side that makes the direction the outside mirror 27L, 27R face change outward only by a predetermined angle; when the vehicle changes lane, it is possible to move the vehicle side field of vision given by the outside mirror 27L, 27R further outward so as to better match the time when the vehicle changes lane while maintaining the rear field of vision given by the inside mirror 28L, 28R, for which the reflection angle does not change when the vehicle changes lane, without obtaining an unnecessary field of vision.

Moreover, since the control unit 154 operates the outside drive means 149 so that the outside mirror holder 120 is returned to the position it was in before the specific operation control state started in response to completion of operation of the gear shift lever or the direction indicator lever by the vehicle driver, it is possible to return the outside mirror 27L, 27R to the position it was in before the specific operation control state started without being accompanied by a special operation, in response to the vehicle travel state returning to a normal state.

Embodiment 6

A sixth embodiment of the present invention is explained by reference to FIG. 20 and FIG. 21; a outside mirror 27R and a inside mirror 28R of a right integrated mirror system 29RA are, as variable color mirrors, electrochromic mirrors that change reflectance by coloring with substantially the same color as a side window glass 34 of a right front side door 19R, that is, pale yellow, in response to the application of a voltage, and changes of the reflection angle and the reflectance of the outside mirror 27R and the inside mirror 28R are controlled by a control unit 161. Remote drive means 160 of the right integrated mirror system 29RA includes a first electric motor 77, a second electric motor 78, an operation section 162, and the control unit 161.

Figure 20:
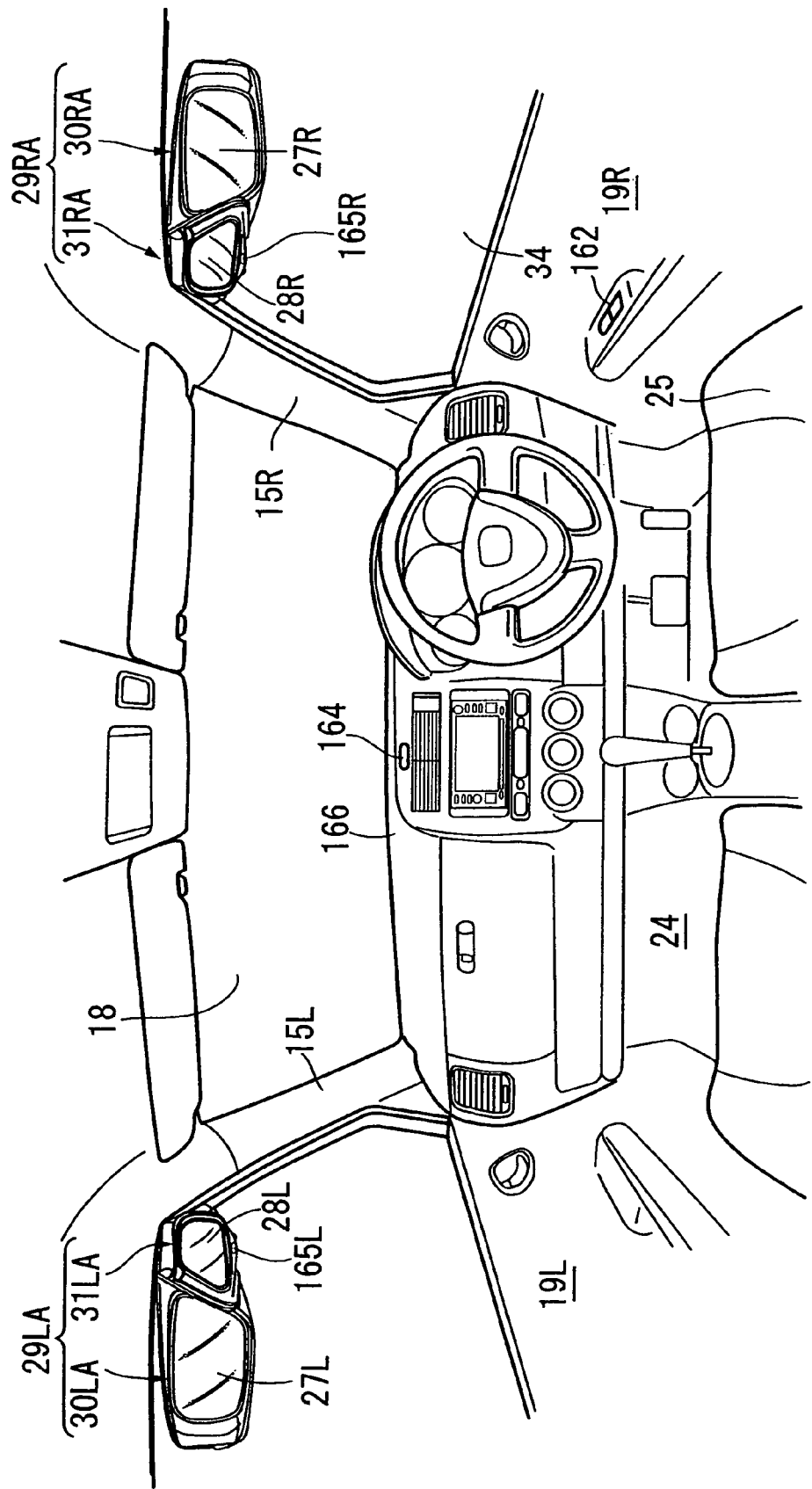
FIG. 20 is a perspective view showing a state when looking forward from the inside of a vehicle compartment of a passenger motor vehicle (sixth embodiment).
Figure 21:
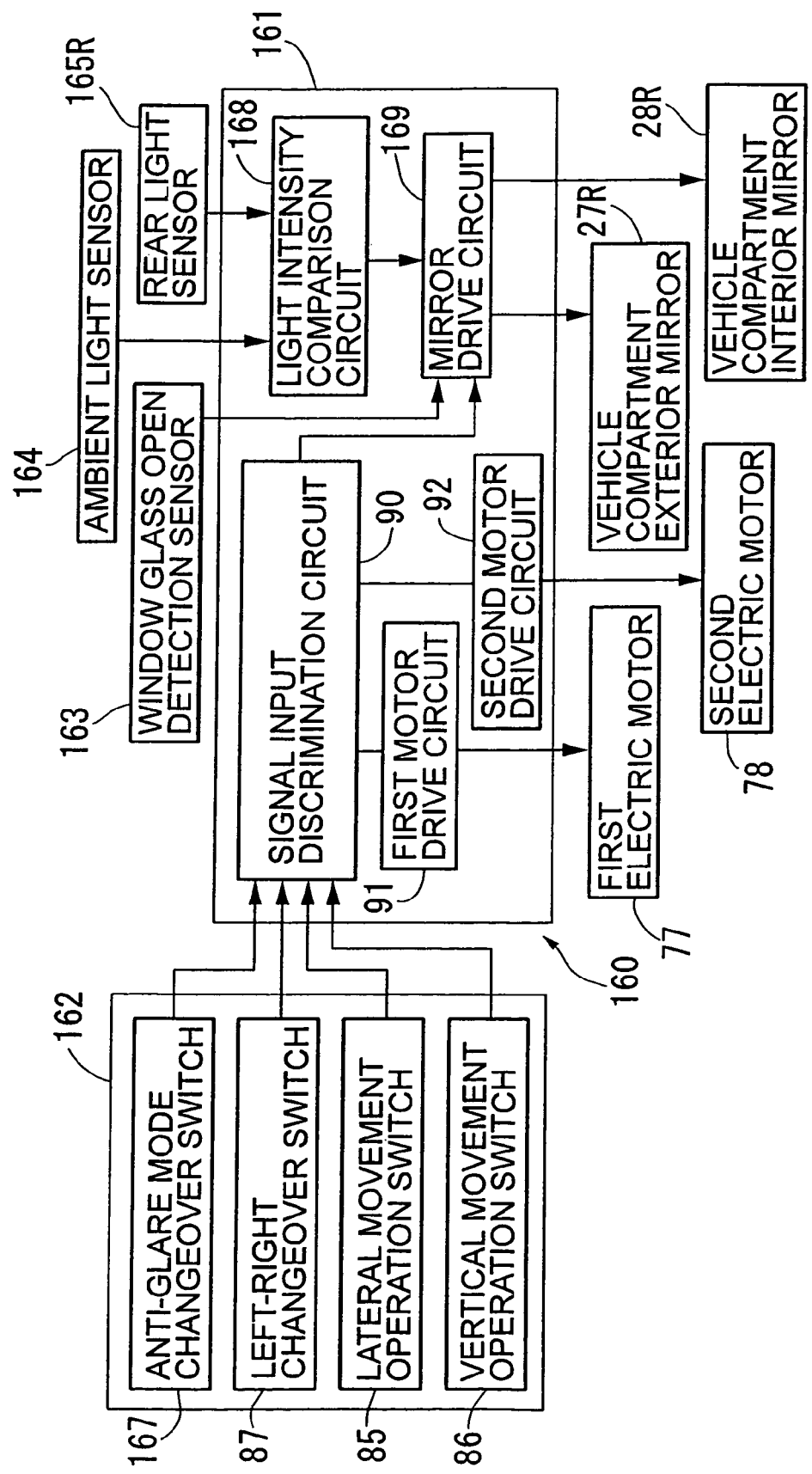
FIG. 21 is a block diagram showing a control system for a right integrated mirror system (sixth embodiment).

Inputted into the control unit 161 are signals from the operation section 162, which is disposed in the vicinity of a driver's seat 25 within a vehicle compartment 24, for example, on an inner face of a right front side door 19R as shown in FIG. 21, a window glass open detection sensor 163 disposed on the right front side door 19R in order to detect opening of the side window glass 34 of the right front side door 19R, an ambient light sensor 164 disposed so as to detect the intensity of light of the surroundings of the right integrated mirror system 29RA, for example, on an instrument panel 166 as shown in FIG. 20, and a rear light sensor 165R disposed so as to detect the intensity of light entering the right integrated mirror system 29RA from the rear, for example, on a inside unit 31RA as shown in FIG. 20.

The operation section 162 includes an anti-glare mode changeover switch 167 for changing between an automatic anti-glare mode and a manual anti-glare mode, a left-right changeover switch 87 for determining which of a left integrated mirror system 29LA and the right integrated mirror system 29RA is selected, a lateral movement operation switch 85 making the outside mirror 27R and the inside mirror 28R swing laterally by operating a first electric motor 77 that exerts a drive force for swinging the outside mirror 27R and the inside mirror 28R laterally, and a vertical movement operation switch 86 making the outside mirror 27R and the inside mirror 28R swing vertically by operating a second electric motor 78 that exerts a drive force for swinging the outside mirror 27R and the inside mirror 28R vertically.

The automatic anti-glare mode is a mode in which the reflectance is automatically decreased by coloring the outside mirror 27R and the inside mirror 28R in response to a difference between the intensity of light of the surroundings of the instrument panel 166 and the intensity of light into the right integrated mirror system 29R from the rear; when a vehicle-mounted engine is started, the automatic anti-glare mode is selected, but by operating the anti-glare mode changeover switch 167 the manual anti-glare mode is selected, in which the outside mirror 27R and the inside mirror 28R are forcibly colored to thus decrease the reflectance or put in a non-anti-glare state.

The control unit 161 includes a signal input discrimination circuit 90 for discriminating an input signal from the anti-glare mode changeover switch 167, a left-right changeover switch 87, the lateral movement operation switch 85, and the vertical movement operation switch 86 of the operation section 162, first and second motor drive circuits 91 and 92 individually driving first and second electric motors 77 and 78 in response to an output signal from the signal input discrimination circuit 90, a light intensity comparison circuit 168 for comparing the intensity of light obtained by the ambient light sensor 164 and that obtained by the rear light sensor 165R, and a mirror drive circuit 169 for controlling the voltage applied to the outside mirror 27R and the inside mirror 28R in response to the comparison result from the light intensity comparison circuit 168 when the automatic anti-glare mode is selected.

Furthermore, a signal from the signal input discrimination circuit 90 is also inputted into the mirror drive circuit 169, and when the manual anti-glare mode is selected by the anti-glare mode changeover switch 167 of the operation section 162, regardless of the light intensity comparison result from the light amount comparison circuit 168, the mirror drive circuit 169 colors the outside mirror 27R and the inside mirror 28R, thus reducing the reflectance, applies a fixed voltage to the mirrors 27R and 28R in order to put them in a non-anti-glare state, or removes the charge.

That is, the mirror drive circuit 169 of the control unit 161 simultaneously carries out control of changeover between anti-glare and non-anti-glare states of the outside mirror 27R and the inside mirror 28R.

Moreover, a signal from the window glass open detection sensor 163 is inputted into the mirror drive circuit 169, and when in a non-anti-glare state, unless the window glass open detection sensor 163 detects opening of the side window glass 34, the mirror drive circuit 169 applies a fixed voltage to the inside mirror 28R in order to color the inside mirror 28R with substantially the same color as that of the side window glass 34. When the window glass open detection sensor 163 detects opening of the side window glass 34 when in a non-anti-glare state, the charge of the inside mirror 28R is removed by the mirror drive circuit 169, and the inside mirror 28R thereby becomes colorless and transparent.

The above control system related to the left integrated mirror system 29LA has basically the same arrangement as that of the control system of the above-mentioned right integrated mirror system 29RA, and a detailed explanation thereof is therefore omitted, but a rear light sensor 165L for detecting the intensity of light entering the left integrated mirror system 29LA from the rear is disposed on the inside unit 31LA of the left integrated mirror system 29LA as shown in FIG. 20.

That is, the anti-glare and non-anti-glare states in the automatic anti-glare mode of the outside mirror 27L and the inside mirror 28L of the left integrated mirror system 29LA are carried out independently from the right integrated mirror system 29RA.

In accordance with the sixth embodiment, in the non-anti-glare state, the inside mirrors 28L and 28R are colored with substantially the same color as that of the colored side window glass 34 in a state in which the side window glass 34 is disposed between the vehicle driver and the outside mirrors 27L and 27R, and it is possible to make the color tone of a reflected image obtained by the outside mirrors 27L and 27R through the side window glass 34 substantially the same as the color tone of a reflected image obtained by the inside mirrors 28L and 28R through the rear window glass 26, which is non-colored, that is, colorless and transparent, thus achieving integration of images obtained by the outside mirrors 27L and 27R and the inside mirrors 28L and 28R and making viewing easy.

Furthermore, since the inside mirrors 28L and 28R are electrochromic mirrors that become colored with substantially the same color as that of the side window glass 34 in response to the application of a voltage and when the window glass open detection sensor 163 for detecting opening of the side window glass 34 detects opening of the side window glass 34 the charge of the inside mirrors 28L and 28R is removed by the control unit 161, when the side window glass 34 is opened, coloring of the inside mirrors 28L and 28R is stopped, so that the color tones of reflected images obtained by each of the outside mirrors 27L and 27R and the inside mirrors 28L and 28R are substantially the same regardless of whether the side window glass 34 is open or closed.

Moreover, since it is possible to put the outside mirrors 27L and 27R and the inside mirrors 28L and 28R in the anti-glare state, it is possible to prevent the vehicle driver from becoming dazzled due to the reflection of light from a light source to the rear of the vehicle.

Furthermore, since control of changeover between the anti-glare and non-anti-glare states is carried out simultaneously for the outside mirror 27R and the inside mirror 28R of the right integrated mirror system 29RA, and control of changeover between the anti-glare and non-anti-glare states is also carried out simultaneously for the outside mirror 27L and the inside mirror 28L of the left integrated mirror system 29LA, it is possible to view a reflected image obtained by the two mirrors 27L, 28L; 27R, 28R without an uncomfortable sensation.

Moreover, since, in the automatic anti-glare mode, the anti-glare and non-anti-glare states of the outside mirrors 27L and 27R and the inside mirrors 28L and 28R are changed over independently from each other for the left integrated mirror system 29LA and the right integrated mirror system 29RA, it is possible to put only the left or right side of the vehicle that is dazzled in the anti-glare state, and excellent visibility can be obtained according to the environment surrounding the vehicle.

In the above sixth embodiment, a case in which the anti-glare state is obtained by coloring the outside mirrors 27L and 27R and the inside mirrors 28L and 28R is explained, but the anti-glare state may be obtained by changing the reflectance by swinging the outside mirrors 27L and 27R and the inside mirrors 28L and 28R in the fore-and-aft direction.

Embodiment 7

Figure 22:
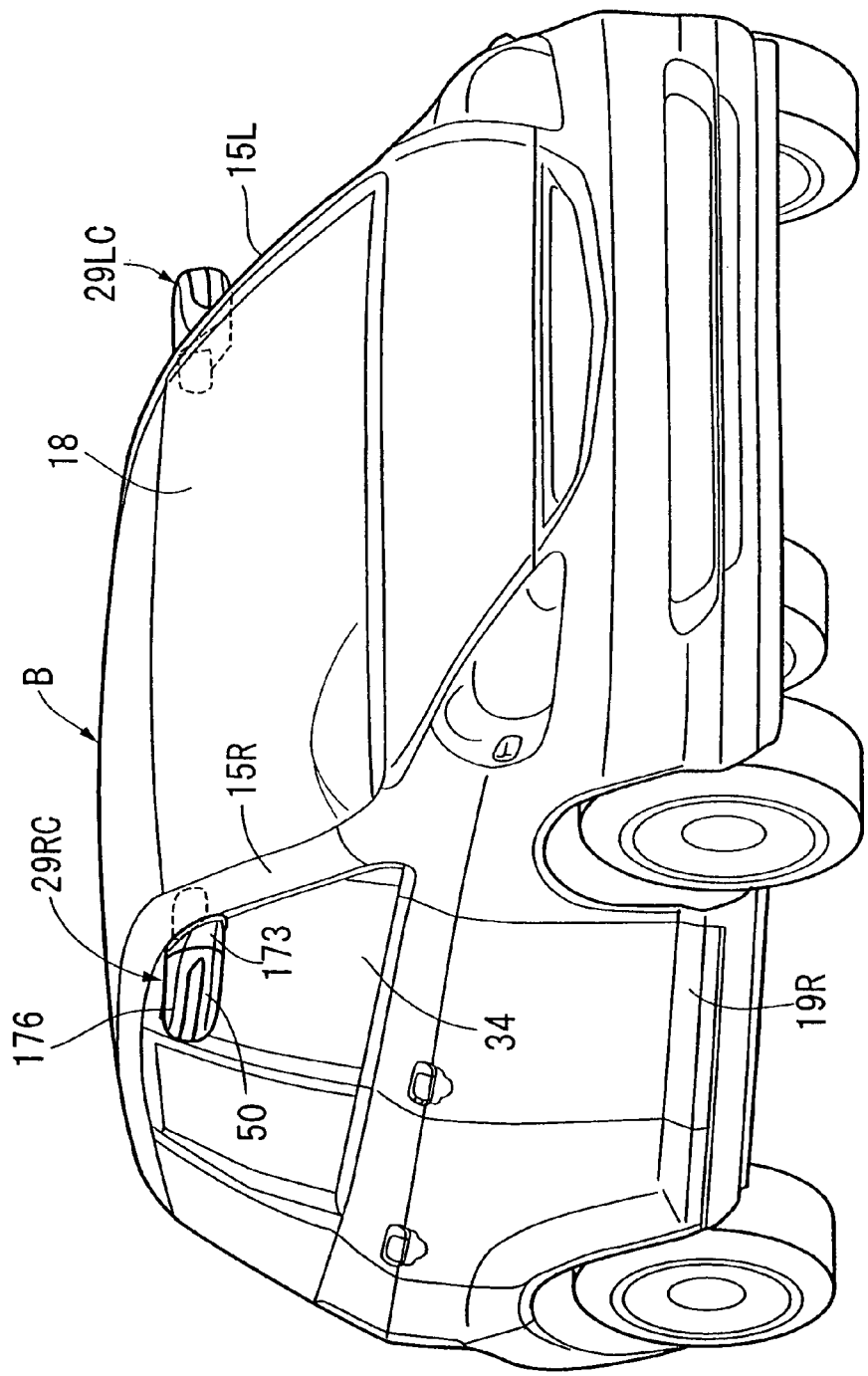
FIG. 22 is a front perspective view of a passenger motor vehicle (seventh embodiment).

A seventh embodiment of the present invention is explained by reference to FIG. 22 to FIG. 26; first, in FIG. 22, mounted on a front upper part of a left front side door 19L (see first embodiment) forming part of a vehicle body B is a left integrated mirror system 29LC having a outside mirror 27L and a inside mirror 28L disposed within a vehicle compartment at a position in the vicinity of the outside mirror 27L so that, in cooperation with the outside mirror 27L, vehicle rear and side fields of vision are simultaneously obtained, and mounted on a front upper part of a right front side door 19R forming part of the vehicle body B is a right integrated mirror system 29RC having a outside mirror 27R and a inside mirror 28R disposed within the vehicle compartment at a position in the vicinity of the outside mirror 27R so that, in cooperation with the outside mirror 27R, vehicle rear and side fields of vision are simultaneously obtained.

Figure 23:
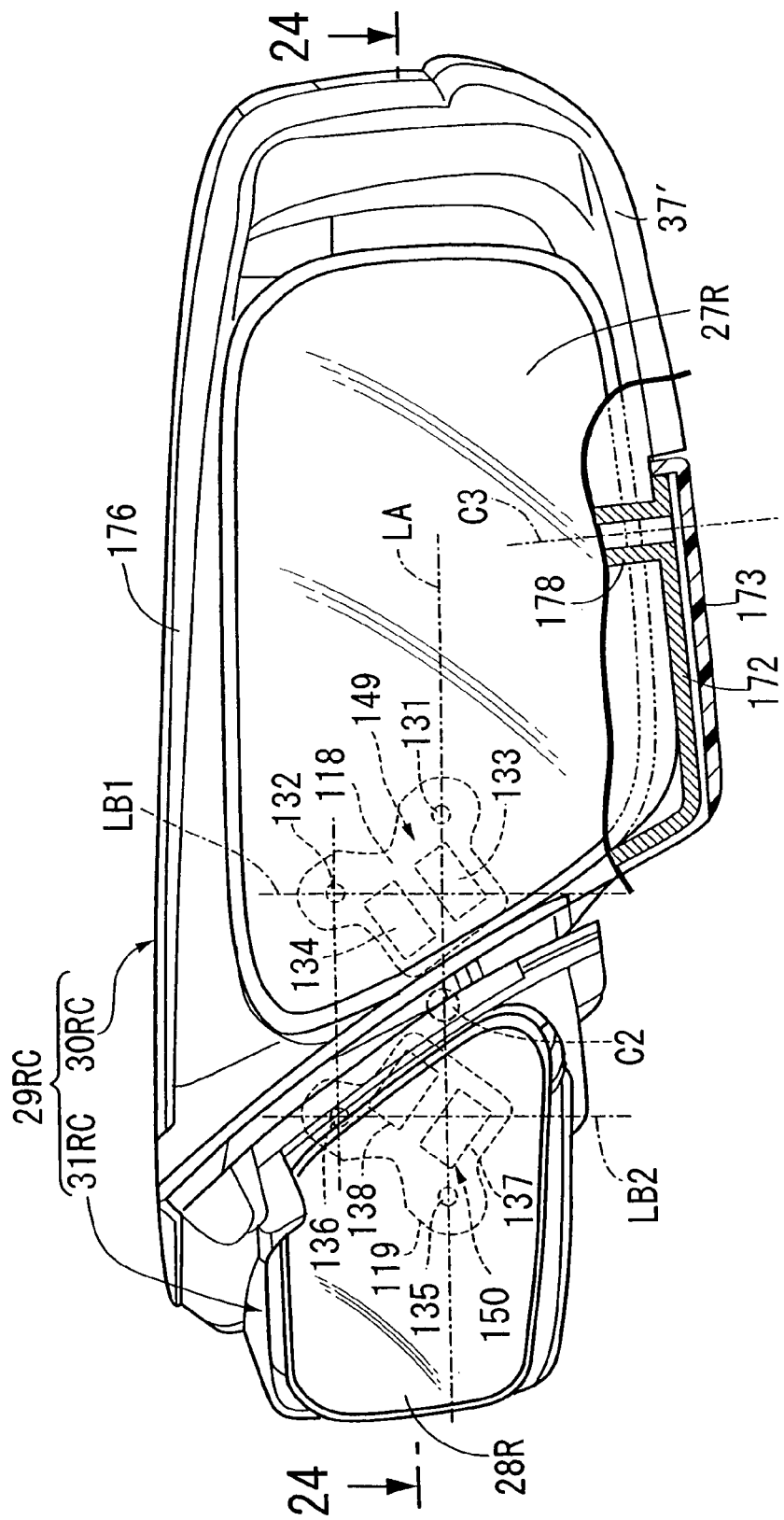
FIG. 23 is a view of a right integrated mirror system from the rear side of the vehicle (seventh embodiment).
Figure 24:
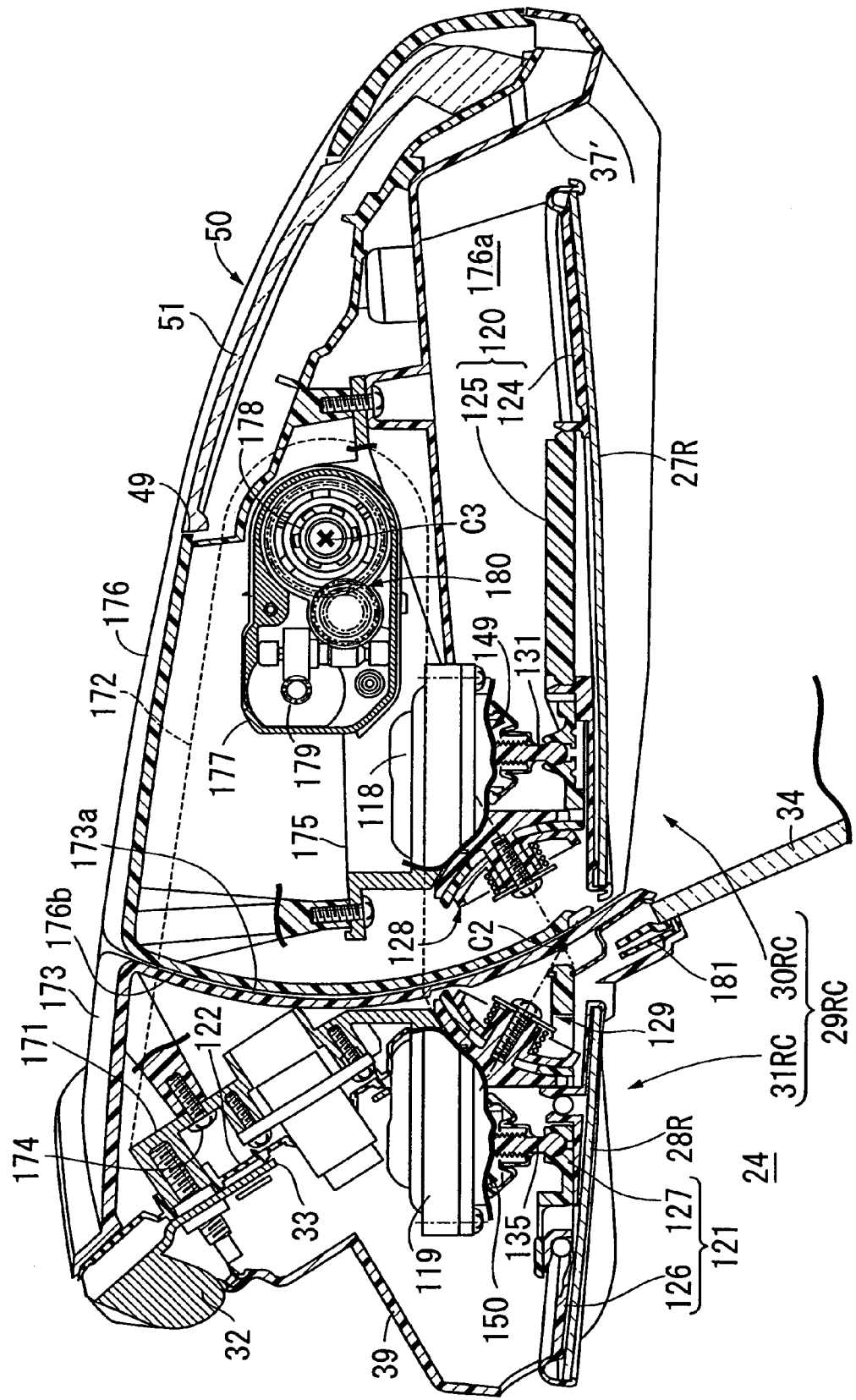
FIG. 24 is a sectional view along line 24-24 in FIG. 23 (seventh embodiment).

In FIG. 23 and FIG. 24, the right integrated mirror system 29RC has a outside unit 30RC disposed outside the vehicle compartment 24 and a inside unit 31RC disposed within the vehicle compartment 24, and is mounted on a support plate 33 provided on a front upper part of a door sash 32 of the right front side door 19R.

The support plate 33 is equipped with an inside bracket 171 with an outside seal member 122 interposed between the inside bracket 171 and the support plate 33 from the outside of the vehicle compartment 24, and part of the inside bracket 171 runs through the outside seal member 122 and projects toward the vehicle compartment 24 side. This inside bracket 171 is provided integrally with a base plate 172 extending outward of the vehicle body B so as to have a substantially L shaped overall form. Moreover, a synthetic resin cover 173 covering the inside bracket 171 and the base plate 172 from the outside is mounted on the inside bracket 171 by a plurality of screw members 174.

The outside unit 30RC includes an outside bracket 175 pivotably supported on the base plate 172, a synthetic resin outside housing 176 disposed above the base plate 172 so as to house the outside bracket 175 and fixed to the outside bracket 175, a visor 37' mounted on the outside housing 176 so as to form an opening 176a of the outside housing 176, and the outside mirror 27R disposed within the opening 176a of the outside housing 176, that is, the visor 37', so as to provide a view to the rear of the vehicle.

The outside bracket 175 is equipped with a housing drive actuator case 177, and a support shaft 178 implanted in the base plate 172 projects into the interior of the housing drive actuator case 177. The housing drive actuator case 177 houses housing drive means 180 that includes a housing drive electric motor 179 having an axis parallel to the support shaft 178 and fixed to the housing drive actuator case 177 so as to pivot the outside bracket 175, that is, the outside housing 176, around the axis of the support shaft 178 in response to operation of the housing drive electric motor 179.

Moreover, the housing drive means 180 pivots the outside housing 176 between a projecting position in which the outside mirror 27R is directed toward the rear of the vehicle and a retracted position in which the outside mirror 27R is directed toward the vehicle body B side. Furthermore, a pivot center C3 of the outside housing 176, that is, the axis of the support shaft 178, is set in a substantially intermediate section along the lateral direction of the outside housing 176 in the projecting position.

In order to enable the outside housing 176 to pivot around the pivot center C3, opposing faces 173a and 176b of the cover 173 and the outside housing 176 are formed in an arc shape with the pivot center C3 as the center.

Moreover, the inside unit 31RC includes a inside housing 39 mounted on the support plate 33, an inside actuator case 119 as mirror support means fixed to the inside bracket 171, and a inside mirror 28R disposed within the inside housing 39 so as to provide a view to the rear of the vehicle.

The outside mirror 27R is retained by an outside mirror holder 120 swingably supported on an outside actuator case 118 mounted on the outside bracket 175, and the inside mirror 28R is retained by an inside mirror holder 121 swingably supported on the inside actuator case 119.

The visor 37' disposed within the outside housing 176 so as to form the opening 176a of the outside housing 176 is secured to the outside housing 176 and the outside bracket 175, and the peripheral edge of the visor 37' is connected to an open edge of the outside housing 176. An opening 49 is provided from an intermediate section to the outside of the outside housing 176, and a lens 51 forming part of a direction indicator 50 is mounted in this opening 49.

Furthermore, an inside seal member 181 is disposed between the inside housing 39, which is made of a synthetic resin and covers the inside mirror 28R from the front side of the vehicle, and an inner face of the support plate 33 facing the vehicle compartment 24 side.

The outside mirror holder 120 is vertically and laterally swingably supported on an outside swing support portion 128 provided on the outside actuator case 118. The inside mirror holder 121 is vertically and laterally swingably supported on an inside swing support portion 129 provided on the inside actuator case 119, which is fixed to the inside bracket 171.

Figure 25:
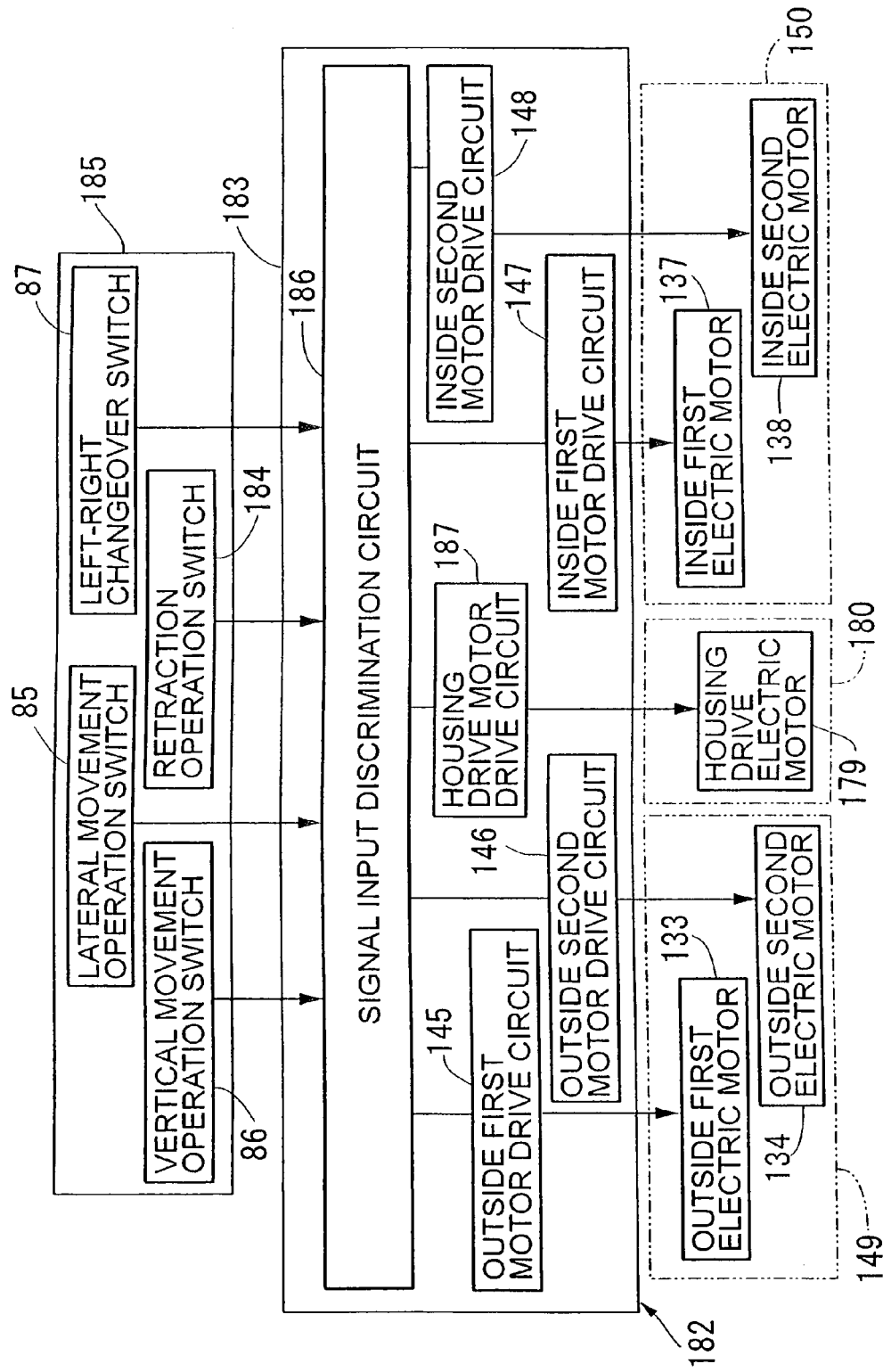
FIG. 25 is a block diagram showing the arrangement of a control system (seventh embodiment).

In FIG. 25, the outside and inside mirror holders 120 and 121, which individually retain the outside mirror 27R and the inside mirror 28R, and the outside housing 176 are made to swing by remote drive means 182.

In a section related to the right integrated mirror system 29RC, the remote drive means 182 includes outside mirror drive means 149 for making the outside mirror holder 120 retaining the outside mirror 27R swing, inside mirror drive means 150 for making the inside mirror holder 121 retaining the inside mirror 28R swing, housing drive means 180 for making the outside housing 176 swing, an operation section 185, and a control unit 183 controlling operation of the outside mirror drive means 149, the inside mirror drive means 150, and the housing drive means 180 in response to input signals from the operation section 185.

A signal from the operation section 185, which is operated by a vehicle driver, is inputted into the control unit 183. This operation section 185 includes a left-right changeover switch 87 for determining which of the left integrated mirror system 29LC and the right integrated mirror system 29RC is selected, a retraction operation switch 184 for operating the housing drive electric motor 179 of the housing drive means 180 in order to pivot the outside housing 176 between a projecting position and a retracted position, a lateral movement operation switch 85 for operating an outside first electric motor 133 and an inside first electric motor 137 so as to make the outside mirror 27R and the inside mirror 28R swing laterally according to the amount of manual operation by the vehicle driver, and a vertical movement operation switch 86 for operating an outside second electric motor 134 and an inside second electric motor 138 so as to make the outside mirror 27R and the inside mirror 28R swing vertically according to the amount of manual operation by the vehicle driver, and this operation section 185 is disposed in the vicinity of a driver's seat 25 within the vehicle compartment 24, for example, on an inner face of the right front side door 19R.

The control unit 183 includes a signal input discrimination circuit 186, and an outside first motor drive circuit 145, an outside second motor drive circuit 146, an inside first motor drive circuit 147, an inside second electric motor drive circuit 148, and a housing drive motor drive circuit 187 for individually driving the two electric motors 133 and 134 of the outside mirror drive means 149, the two electric motors 137 and 138 of the inside mirror drive means 150, and the housing drive electric motor 179 of the housing drive means 180 in response to an output signal from the signal input discrimination circuit 186.

Moreover, when the outside housing 176 is pivoted from the projecting position to the retracted position by the retraction operation switch 184, the signal input discrimination circuit 186 outputs a signal for operating the inside first electric motor 137 of the inside mirror drive means 150 so as to make the inside mirror 28R swing outward only by a fixed angle.

The left integrated mirror system 29LC is mounted on a front upper part of the left front side door 19L forming part of the vehicle body B, the left integrated mirror system 29LC being formed from a outside unit 30LC having a outside mirror 27L disposed outside the vehicle compartment 24 and a inside unit 31LC having a inside mirror 28L disposed within the vehicle compartment 24 at a position in the vicinity of the outside mirror 27L so that, in cooperation with the outside mirror 27L, a rear field of vision of the vehicle is obtained, and since the arrangement of the left integrated mirror system 29LC and the control system related to the left integrated mirror system 29LC are basically the same as the arrangement of the above-mentioned right integrated mirror system 29RC and control system, a detailed explanation is omitted.

In accordance with this seventh embodiment, the outside housing 176 disposed outside the vehicle body B is supported on the base plate 172 fixed to the front side doors 19L and 19R so that it can pivot between the projecting position and the retracted position, and the pivot center C3 of the outside housing 176 is set at substantially the middle along the lateral direction of the outside housing 176 in the projecting position. It is therefore possible to enhance the weight balance of the outside housing 176 by pivotably supporting the outside housing 176 at substantially the middle on the base plate 172, and to support the outside housing 176 well so that it withstands vibration from the vehicle body B or windflow while avoiding any increase in weight due to the support strength being enhanced.

Furthermore, since the inside mirrors 28L and 28R are disposed within the vehicle compartment 24 at positions in the vicinity of the outside mirrors 27L and 27R, it is possible to obtain a wide rear field of vision from cooperation of the outside mirrors 27L and 27R and the inside mirrors 28L and 28R. Moreover, when the outside housing 176 is pivoted to the retracted position, by reducing that part of the outside housing 176 positioned behind the inside mirrors 28L and 28R, it is possible to avoid the outside housing 176 interfering with the rear view given by the inside mirrors 28L and 28R.

Furthermore, the inside mirrors 28L and 28R are supported on the inside actuator case 119, which is fixed to the vehicle body B so that it can swing independently from the outside mirrors 27L and 27R, and when the housing drive electric motor 179 of the housing drive means 180 operates so as to pivot the outside housing 176 to the retracted position, the control unit 183 operates the inside first electric motor 137 of the inside mirror drive means 150 so that the inside mirrors 28L and 28R swing outward only by a fixed angle.

Figure 26:
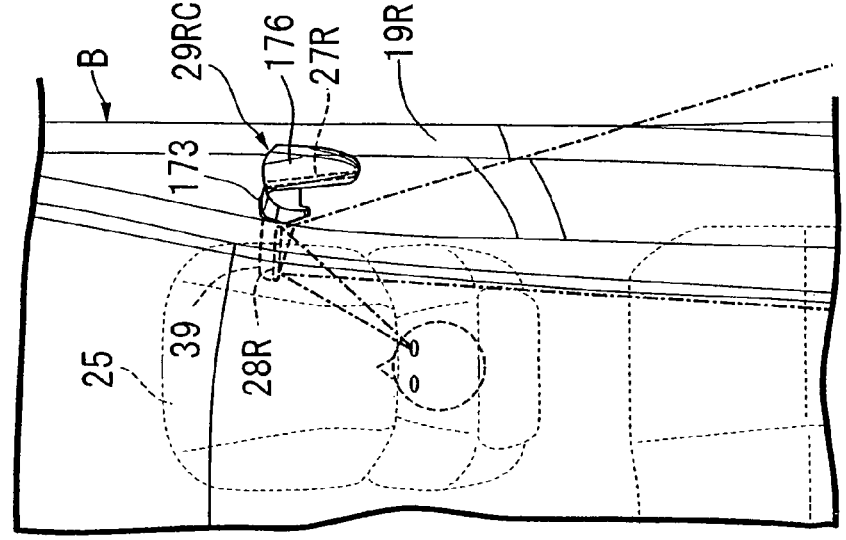
FIG. 26 is a plan view showing a comparison of (A) a state in which a outside housing is at a projecting position and (B) a state in which the outside housing is at a retracted position (seventh embodiment).
Figure 26B:
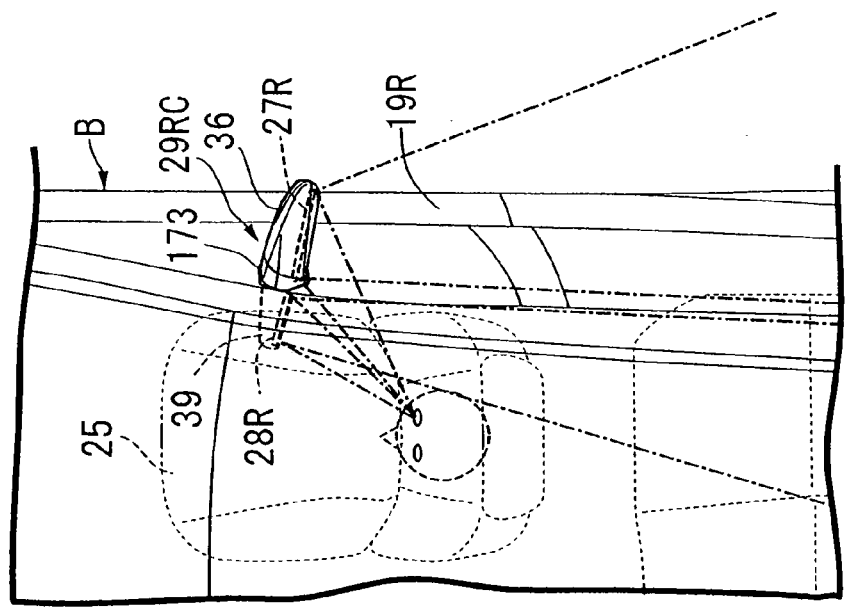

As shown in FIG. 26(A), when the outside housing 176 is in the projecting position, the rear field of vision obtained by the outside mirror 27R and the inside mirror 28R is a wide area, as shown by the dotted-dashed lines, but as shown in FIG. 26(B), when the outside housing 176 is in the retracted position, a rear field of vision cannot be obtained by the outside mirror 27R, and the rear field of vision is obtained only by the inside mirror 28R. As described above, when the outside housing 176 is pivoted to the retracted position, the inside mirror 28R swings outward only by a fixed angle, and the field of vision obtained by the inside mirror 28R shifts outward as shown by the dotted-dashed lines. That is, part of the rear field of vision that is lost by the outside mirror 27R facing toward the vehicle body B side as a result of the outside housing 176 pivoting to the retracted position can be maintained by the inside mirror 28R swinging outward only by a fixed angle, and a sufficient field of vision can be obtained during parking in a confined parking place, etc.

Embodiments of the present invention are explained above, but the present invention is not limited to the above-mentioned embodiments and may be modified in a variety of ways as long as the modifications do not depart from the present invention described in Claims.

The invention claimed is:

1. A vehicular integrated mirror system that is supported on a vehicle body that includes a door, and has an outside mirror disposed outside a vehicle compartment and an inside mirror disposed within the vehicle compartment at a position proximate the outside mirror so that, in cooperation with the outside mirror, a vehicle rear field of vision is obtained, wherein the system comprises:
  a mirror holder retaining the outside mirror and the inside mirror thereon:
  a mirror support device mounted on the vehicle body so as to swingably support the mirror holder thereon in order to change a reflection angle of the two mirrors relative to a vehicle driver; and
  a remote drive device for making the mirror holder swing by remote operation in order to change the reflection angle of the outside mirror and the inside mirror;
  wherein the mirror holder comprises an outside mirror holder and an inside mirror holder respectively retaining the outside mirror and the inside mirror thereon, wherein said outside mirror holder and said inside mirror holder are supported on the mirror support device and are operable so as to swing independently from each other,
  wherein the remote drive device comprises:
    an outside drive device and an inside drive device for respectively making the outside and inside mirror holders swing;
    a control unit for controlling operation of the outside drive device and the inside drive device, the control unit being switchable between a normal operation control state in which the outside and inside drive devices are both operated so as to make the outside mirror holder and the inside mirror holder swing in association, and a specific operation control state in which only the outside drive device is operated so as to make the outside mirror holder swing on its own; and
    a remote operation member that enables manual operation by a vehicle driver on a driver's seat of the vehicle, wherein:
  the control unit selects the specific operation control state, and operates the outside drive device only by a predetermined amount toward a side that makes a direction the outside mirror faces change downward only by a predetermined angle, in response to an operation of an operation device operated by the vehicle driver when reversing the vehicle,
  the control unit operates the outside drive device so as to return the outside mirror holder to the position the outside mirror holder was in before the specific operation control state started in response to the vehicle driver completing operation of the operation device, when the operation by the vehicle driver for reversing the vehicle is not detected, the control unit selects the normal operation control state in which the outside mirror holder and the inside mirror holder are made to swing in association with each other in response to a signal input from the remote operation member, and when the operation by the vehicle driver for reversing the vehicle is detected, the control unit is switched to select the specific operation control state in which only the outside driver device is operated to make the outside mirror holder swing on its own.

2. A vehicular integrated mirror system that is supported on a vehicle body that includes a door, and has an outside mirror disposed outside a vehicle compartment and an inside mirror disposed within the vehicle compartment at a position proximate the outside mirror so that, in cooperation with the outside mirror, a vehicle rear field of vision is obtained, wherein the system comprises:

a mirror holder retaining the outside mirror and the inside mirror:

a mirror support device mounted on the vehicle body so as to swingably support the mirror holder in order to change a reflection angle of the two mirrors relative to a vehicle driver; and a remote drive device making the mirror holder swing by remote operation in order to change the reflection angle of the outside mirror and the inside mirror;

wherein the mirror holder comprises an outside mirror holder and an inside mirror holder respectively retaining the outside mirror and the inside mirror thereon, said outside mirror holder and said inside mirror holder are supported on the mirror support device and are operable so as to swing independently from each other, wherein the remote drive device comprises:

an outside drive device and an inside drive device for respectively making the outside and inside mirror mirror holders swing;

a control unit for controlling operation of the outside drive device and the inside drive device, the control unit being switchable between a normal operation control state in which the outside and inside drive devices are both operated so as to make the outside mirror holder and the inside mirror holder swing in association and a specific operation control state in which only the outside drive device is operated so as to make the outside mirror holder swing on its own; and a remote operation member that enables manual operation by a vehicle driver on a driver's seat of the vehicle, wherein:

the control unit selects the specific operation control state, and operates the outside drive device only by a predetermined amount toward a side that makes a direction the outside mirror faces change downward only by a predetermined angle, in response to an operation of an operation device operated by the vehicle driver when changing a path of the vehicle, the control unit operates the outside drive device so as to return the outside mirror holder to the position the outside mirror holder was in before the specific operation control state started in response to the vehicle driver completing operation of the operation device, when the operation by the vehicle driver for changing the path of the vehicle is not detected, the control unit selects the normal operation control state in which the outside mirror holder and the inside mirror holder are made to swing in association with each other in response to a signal input from the remote operation member, and when the operation by the vehicle driver for changing the path of the vehicle is detected, the control unit is switched to select the specific operation control state in which only the outside driver device is operated to make the outside mirror holder swing on its own.

\* \* \* \* \*